(12) United States Patent
Baczuk et al.

(10) Patent No.: US 12,712,993 B2
(45) Date of Patent: Aug. 18, 2026

(54) DYNAMIC RESOLUTION OF DEPTH CONFLICTS IN TELEPRESENCE

(71) Applicant: GOOGLE LLC, Mountain View, CA (US)

(72) Inventors: Eric Baczuk, Palo Alto, CA (US); Daniel Edmond Fish, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 547 days.

(21) Appl. No.: 18/249,655

(22) PCT Filed: Dec. 16, 2020

(86) PCT No.: PCT/US2020/070912
§ 371 (c)(1),
(2) Date: Apr. 19, 2023

(87) PCT Pub. No.: WO2022/086580
PCT Pub. Date: Apr. 28, 2022

(65) Prior Publication Data

US 2023/0396750 A1 Dec. 7, 2023

Related U.S. Application Data

(60) Provisional application No. 63/198,473, filed on Oct. 21, 2020.

(51) Int. Cl.
*H04N 13/128* (2018.01)
*G06F 3/0481* (2022.01)
(Continued)

(52) U.S. Cl.
CPC ......... *H04N 13/128* (2018.05); *G06F 3/0481* (2013.01); *G06T 7/593* (2017.01);
(Continued)

(58) Field of Classification Search
CPC .. H04N 13/128; H04N 13/167; H04N 13/183; H04N 13/366; H04N 13/305;
(Continued)

(56) References Cited

U.S. PATENT DOCUMENTS 5,847,870 A * 12/1998 Ohtsuka ............... H04N 13/122 348/E13.067
9,479,767 B2 10/2016 Van Der Horst
(Continued)

FOREIGN PATENT DOCUMENTS

| | | |
|---|---|---|
| CN | 102783161 A | 11/2012 |
| CN | 104272733 A | 1/2015 |
| GB | 2499426 A | 8/2013 |

OTHER PUBLICATIONS

Gardner, Brian, "The Dynamic Floating Window: a new creative tool for 3D movies", Proceedings vol. 7863, Stereoscopic Displays and Applications XXII; 78631A (Year: 2011).*

(Continued)

*Primary Examiner* — William A Beutel
(74) *Attorney, Agent, or Firm* — Brake Hughes Bellermann LLP

(57) ABSTRACT

Systems and methods are described for determining a capture volume associated with image content captured by at least one camera, determining depths associated with the image content, defining a viewing range in which stereoscopic effects are depicted when viewing the image content, determining a depth conflict between the image content and a boundary associated with the viewing range, the determining including detecting that at least one portion of the image content extends beyond the boundary associated with the viewing range and resolving the depth conflict for the at least one portion using the viewing range and at least one
(Continued)

user interface element and generating, for rendering, modified image content with the resolved depth conflict.

17 Claims, 22 Drawing Sheets

(51) Int. Cl.

| | |
|---|---|
| ***G06T 7/593*** | (2017.01) |
| ***H04N 13/167*** | (2018.01) |
| ***H04N 13/183*** | (2018.01) |
| ***H04N 13/366*** | (2018.01) |
| *H04N 13/00* | (2018.01) |
| *H04N 13/305* | (2018.01) |

(52) U.S. Cl.
CPC ......... *H04N 13/167* (2018.05); *H04N 13/183* (2018.05); *H04N 13/366* (2018.05); *G06T 2200/24* (2013.01); *G06T 2207/10012* (2013.01); *G06T 2207/10016* (2013.01); *G06T 2207/30196* (2013.01); *H04N 2013/0081* (2013.01); *H04N 2013/0096* (2013.01); *H04N 13/305* (2018.05)

(58) Field of Classification Search
CPC ... H04N 2013/0081; H04N 2013/0096; H04N 13/122; G06F 3/0481; G06T 7/593; G06T 2200/24; G06T 2207/10012; G06T 2207/10016; G06T 2207/30196
See application file for complete search history.

(56) References Cited

U.S. PATENT DOCUMENTS

| | | | | |
|---|---|---|---|---|
| 2004/0233222 | A1* | 11/2004 | Lee | G06F 3/04815 345/621 |
| 2005/0088452 | A1 | 4/2005 | Hanggie et al. | |
| 2012/0056883 | A1* | 3/2012 | Kudo | H04N 13/139 345/419 |
| 2012/0307023 | A1 | 12/2012 | Freiburg et al. | |
| 2013/0010093 | A1 | 1/2013 | Redmann | |
| 2013/0250062 | A1 | 9/2013 | Tin | |
| 2014/0152768 | A1 | 6/2014 | Noh et al. | |
| 2017/0295357 | A1* | 10/2017 | Yang | H04N 13/128 |
| 2019/0295280 | A1 | 9/2019 | Diverdi et al. | |

OTHER PUBLICATIONS

International Search Report and Written Opinion for PCT Application No. PCT/US2020/070912, mailed on Jun. 18, 2021, 13 pages.
Gardner, "The Dynamic Floating Window—A New Creative Tool for 3D Movies", Stereoscopic Displays and Applications XXII; Proceedings of SPIE—IS&T Electronic Imaging, SPIE vol. 7863, 2011, 78631A-1-78631A-12.

* cited by examiner

DYNAMIC RESOLUTION OF DEPTH CONFLICTS IN TELEPRESENCE

CROSS REFERENCE TO RELATED APPLICATION

This application is a 35 U.S.C. § 371 National Phase Entry Application from PCT/US2020/070912, filed Dec. 16, 2020, designating the U.S., and claims the benefit of U.S. Provisional Application No. 63/198,473, filed Oct. 21, 2020, the disclosures of which are incorporated herein by reference in their entireties.

TECHNICAL FIELD

This description generally relates to methods, devices, and algorithms used to resolve depth conflicts in three-dimensional (3D) telepresence systems.

BACKGROUND

Stereoscopic display devices generally provide content and convey depth perception to a viewer. Such displays may include a bordered frame surrounding the display screen which may unnaturally cut off a view of a portion of content to be rendered on the display screen. The cut off view may create a conflicting visual cue for a viewer. Such a conflict can diminish the 3D effect, which can cause visual fatigue for the viewer.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, systems and methods are described that utilize at least one processing device to perform operations including determining a capture volume associated with image content captured by at least one camera, determining depths associated with the image content, defining, within the capture volume and based on the depths, a viewing range in which stereoscopic effects are depicted when viewing the image content, determining a depth conflict between the image content and a boundary associated with the viewing range, the determining including detecting that at least one portion of the image content extends beyond the boundary associated with the viewing range and responsive to determining the depth conflict, resolving the depth conflict for the at least one portion using the viewing range and at least one user interface element, and generating, for rendering, modified image content with the resolved depth conflict, the modified image content including portions of the image content replaced by the at least one user interface element.

These and other aspects can include one or more of the following, alone or in combination. For example, the systems and methods may include detecting a depth conflict between the at least one portion of the image content and the boundary associated with the viewing range includes using at least some of the determined depths associated with the image content to generate a plurality of three-dimensional voxels representing a position in a plane of a display rendering the image content, the distance being from the at least one portion to the boundary where the at least one user interface element is selected based on the distance.

In some implementations, the boundary is associated with at least one edge of a lenticular display device, the depth conflict is determined based on a tracked head position of a user viewing the image content at a remote lenticular display device, and resolving the depth conflict includes adjusting a size of the user interface element based on the tracked head position of the user.

In some implementations, resolving the depth conflict includes generating the at least one user interface element as a frame overlaying at least some of the image content, the at least one frame being adaptive to accommodate movements depicted in the image content. In some implementations, a side of the frame that corresponds to the at least one portion that extended beyond the boundary is placed in a different plane parallel to, and in front of, the remainder of the frame to generate a visually perceived tilt of the frame from vertical to a non-zero angle to the vertical.

In some implementations, the at least one user interface element depicts a user interface layer having thumbnail images of additional software programs being executed in memory by the at least one processing device while accessing the image content. In some implementations, the user interface element includes a blurred overlay, the blurred overlay beginning at the boundary and ending at a predefined location associated with a size of a display device depicting the image content, wherein a blur radius associated with the blurred overlay is increased at a threshold distance from the boundary.

In some implementations, the blurred overlay includes a user interface layer having thumbnail images of additional software programs being executed in memory by the at least one processing device while accessing the image content and the blurred overlay is oval-shaped. In some implementations, the blurred overlay is gradient blur graduating from a left central portion of the overlay to a left edge of the image content and from a right central portion of the overlay to a right edge of the image content. In some implementations, the gradient blur is placed at a central position associated with the depth conflict and gradually blurred outward to a first edge and a second edge associated with the depth conflict. In some implementations, resolving the depth conflict includes animating the at least one user interface element to hide the at least one portion of the image content with the modified image content.

The systems and aspects above may be configured to perform any combination of the above-described aspects, each of which may be implemented together with any suitable combination of the above-listed features and aspects.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
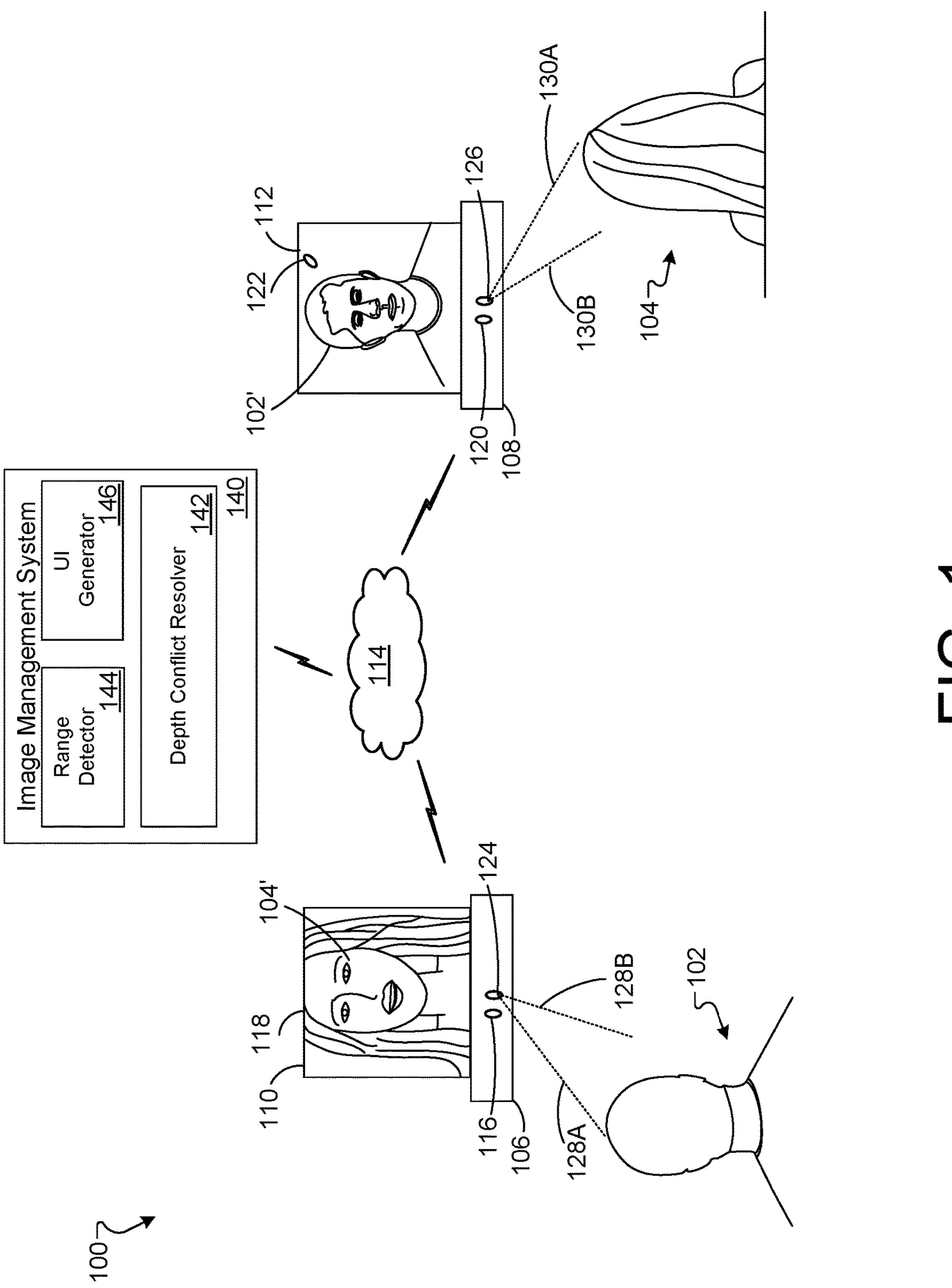
FIG. 1 is a block diagram illustrating an example 3D content system for displaying image content on a display device, according to implementations described throughout this disclosure.

In general, this document describes examples related to detecting, analyzing, and correcting depth conflicts within three-dimensional (3D) video content. The depth conflicts may occur with respect to user interface (UI) elements within the video content. For example, in 3D video content (e.g., stereoscopic video), user-perceived depth may vary within portions of the video. Such depth variations can cause depth conflict between portions of the video, UI elements in the video, and/or at borders associated with content in the video and/or displays depicting the content.

Depth conflicts can create discomfort for the user which may contribute to difficulty for a user when focusing or shifting focus within the portions and/or UI elements of image content. For example, a depth conflict may occur if a portion of a user is cut off at an edge of a display screen depicting the image content based on the camera capturing such content having a maximum capture space. Disappearance of a hand (or other object or user portion) beyond the edge of the display may be incongruent to what the eyes (i.e., brain) of the user expects to occur. In particular, the movement beyond the edge (or other defined boundary) may cause a depth conflict including artifacts that cause depth cues for the user to conflict with the expected outcome of the movement in the content (i.e., as perceived by the brain of the user).

The systems and methods described herein are configured to maximize a zone of comfort for the user by minimizing or eliminating depth conflicts. Maximizing the zone of comfort for the user may include assessing depths for the regions both in front of and behind the display screen in order to place UI elements within a 3D video (or other image content) such that the placed UI elements adhere to depth rules and/or minimize violation of such rules. In some implementations, the systems and methods described herein can reduce or eliminate depth conflicts by generating and rendering UI elements that are transparent, semi-transparent, blurred, partially blurred, blurred according to a gradient, etc.

The systems and methods described herein may provide several advantages over conventional video rendering systems. For example, the systems and methods described herein may dynamically modify the depth of a UI element or object depicted as image content and/or video content based on depths of other objects within a 3D video. Unlike conventional systems that remove content from videos when the content causes a depth conflict, the systems and methods described herein function to improve the view of the content that may be causing the depth conflict, as described in examples throughout this disclosure.

As used herein, the depth can refer to a perceived distance from a position to content depicted on a display screen. As used herein, the depth cue can refer to an indication or hint of distance that contributes toward visual depth perception that a user may comprehend through the eyes. Example depth cues may include any or all of vergence, monocular movement parallax, binocular parallax, linear perspective, texture gradient, accommodation, retinal image size, overlap, shades, shadows, and aerial perspective.

As used herein, the depth conflict can refer to an incongruity between depth cues perceived by a user. For example, the user can perceive depth based on any number of depth cues corresponding to the user's field of vision. A depth conflict may occur when two or more of such depth cues are incongruent with one another. Example depth conflicts may include, but are not limited to, near conflicts, far conflicts, pictorial conflicts, and/or occlusion and stereopsis conflicts.

Example corrections to depth conflicts can include, but are not limited to, eliminating a depth conflict, modifying pixels or voxels to modify the depth conflict, reducing the depth conflict, and/or generating and/or moving content to reduce or eliminate the depth conflict, etc. In some implementations, the systems and methods described herein select one or more depth conflict corrections from any number of depth conflict correction techniques. For example, the systems and methods described herein may combine two or more UI elements to correct a depth conflict.

In some implementations, the techniques described herein can be used to synthesize depth corrected images that appear accurate and realistic for display on a screen of a 2D or 3D display used in a multi-way videoconference, for example. The techniques described herein can be used to generate and display accurate and realistic views (e.g., image content, video content) of users, objects, and UI content and correct for user movement or 3D display conflicts.

FIG. 1 is a block diagram illustrating an example 3D content system 100 for displaying content in a stereoscopic display device, according to implementations described throughout this disclosure. The 3D content system 100 can be used by one or more users to, for example, conduct videoconference communications in 3D (e.g., telepresence sessions), view content on a single 3D display or other device. In general, the system of FIG. 1 may be used to capture video and/or images of users and/or objects during a videoconference and use the systems and techniques described herein to correct for depth conflicts that may occur amongst the display of users, objects, and/or other additional UI content.

System 100 may benefit from the use of the techniques described herein because such techniques can generate, modify, update, and display corrected (e.g., resolved depth) views for a capture volume associated with particular display screen devices. In some implementations, the capture volume may be used to determine how to correct for depth conflicts. The resolved depth of view may be displayed to another user in a 2D and/or 3D manner via system 100, for example.

As used herein, a capture volume may refer to a physical volume of space that may be confined by one or more boundaries imposed by one more cameras capturing image/video content within the defined one or more boundaries. In some implementations, the capture volume may refer to a viewing volume in which a user can be tracked continuously by a plurality of image sensors (e.g., cameras).

As shown in FIG. 1, the 3D content system 100 is being used by a first user 102 and a second user 104. For example, the users 102 and 104 are using the 3D content system 100 to engage in a 3D telepresence session. In such an example, the 3D content system 100 can allow each of the users 102 and 104 to see a highly realistic and visually congruent representation of the other, thereby facilitating the users to interact in a manner similar to being in the physical presence of each other. The system 100 may have access to a depth conflict resolver to improve, correct, reduce, or otherwise modify depth conflicts that may occur during a session of the 3D telepresence session.

Each user 102, 104 can have a corresponding 3D system. Here, the user 102 has a 3D system 106 and the user 104 has a 3D system 108. The 3D systems 106, 108 can provide functionality relating to 3D content, including, but not limited to capturing images for 3D display, processing and presenting image information, and processing and presenting audio information. The 3D system 106 and/or 3D system 108 can constitute a collection of sensing devices integrated as one unit. The 3D system 106 and/or 3D system 108 can include some or all components described with reference to FIGS. 2 and 14.

The 3D content system 100 can include one or more 2D or 3D displays. Here, a 3D display 110 is provided for the 3D system 106, and a 3D display 112 is provided for the 3D system 108. The 3D displays 110, 112 can use any of multiple types of 3D display technology to provide an autostereoscopic view for the respective viewer (here, the user 102 or user 104, for example). In some implementations, the 3D displays 110, 112 may be a standalone unit (e.g., self-supported or suspended on a wall). In some implementations, the 3D displays 110, 112 can include or have access to wearable technology (e.g., controllers, a head-mounted display, smart glasses, a watch, etc.). In some implementations, displays 110, 112 may be 2D displays.

In general, displays, such as displays 110, 112 can provide imagery that approximates the 3D optical characteristics of physical objects in the real world without the use of a head-mounted display (HMD) device. In general, the displays described herein include flat panel displays, lenticular lenses (e.g., microlens arrays), and/or parallax barriers to redirect images to a number of different viewing regions associated with the display.

In some implementations, the displays 110, 112 can include a high-resolution and glasses-free lenticular 3D display. For example, displays 110, 112 can include a microlens array (not shown) that includes a plurality of lenses (e.g., microlenses) with a glass spacer coupled (e.g., bonded) to the microlenses of the display. The microlenses may be designed such that, from a selected viewing position, a left eye of a user of the display may view a first set of pixels while the right eye of the user may view a second set of pixels (e.g., where the second set of pixels is mutually exclusive to the first set of pixels).

In some example displays, there may be a single location that provides a 3D view of image content (e.g., users, objects, content, etc.) provided by such displays. A user may be seated in the single location to experience proper parallax, minimal distortion, and realistic 3D images. If the user moves to a different physical location (or changes a head position or eye gaze position), the image content (e.g., the user, objects worn by the user, and/or other objects) may begin to appear less realistic, 2D, and/or distorted. The systems and techniques described herein may reconfigure the image content projected from the display to ensure that the user can move around, but still experience proper parallax, low rates of distortion, minimal depth conflict, and realistic 3D images in real time. Thus, the systems and techniques described herein provide the advantage of maintaining and providing 3D image content and objects for display to a user regardless of any user movement that occurs while the user is viewing the 3D display.

As shown in FIG. 1, the 3D content system 100 can be connected to one or more networks. Here, a network 114 is connected to the 3D system 106 and to the 3D system 108. The network 114 can be a publicly available network (e.g., the Internet), or a private network, to name just two examples. The network 114 can be wired, or wireless, or a combination of the two. The network 114 can include, or make use of, one or more other devices or systems, including, but not limited to, one or more servers (not shown).

The 3D systems 106, 108 can include multiple components relating to the capture, processing, transmission or reception of 3D information, and/or to the presentation of 3D content. The 3D systems 106, 108 can include one or more cameras for capturing image content for images to be included in a 3D presentation. Here, the 3D system 106 includes cameras 116 and 118. For example, the camera 116 and/or camera 118 can be disposed essentially within a housing of the 3D system 106, so that an objective or lens of the respective camera 116 and/or 118 captured image content by way of one or more openings in the housing. In some implementations, the camera 116 and/or 118 can be separate from the housing, such as in form of a standalone device (e.g., with a wired and/or wireless connection to the 3D system 106). The cameras 116 and 118 can be positioned and/or oriented so as to capture a sufficiently representative view of a user (e.g., user 102).

While the cameras 116 and 118 generally will not obscure the view of the 3D display 110 for the user 102, the placement of the cameras 116 and 118 can be arbitrarily selected. For example, one of the cameras 116, 118 can be positioned somewhere above the face of the user 102 and the other can be positioned somewhere below the face. For example, one of the cameras 116, 118 can be positioned somewhere to the right of the face of the user 102 and the other can be positioned somewhere to the left of the face. The 3D system 108 can in an analogous way include cameras 120 and 122, for example. Additional cameras are possible. For example, a third camera may be placed near or behind display 110.

In some implementations, the 3D systems 106, 108 can include one or more depth sensors to capture depth data to be used in a 3D presentation. Such depth sensors can be considered part of a depth capturing component in the 3D content system 100 to be used for characterizing the scenes captured by the 3D systems 106 and/or 108 in order to correctly represent the scenes on a 3D display. In addition, the system can track the position and orientation of the viewer's head, so that the 3D presentation can be rendered with the appearance corresponding to the viewer's current point of view. Here, the 3D system 106 includes a depth sensor 124. In an analogous way, the 3D system 108 can include a depth sensor 126. Any of multiple types of depth sensing or depth capture can be used for generating and/or modifying depth data.

In some implementations, an assisted-stereo depth capture is performed. A scene can be illuminated using dots of lights, and stereo-matching can be performed between two respective cameras, for example. This illumination can be done using waves of a selected wavelength or range of wavelengths. For example, infrared (IR) light can be used. In some implementations, depth sensors may not be utilized when generating views on 2D devices, for example.

Depth data can include or be based on any information regarding a scene that reflects the distance between a depth sensor (e.g., the depth sensor 124) and an object or UI element in the scene. The depth data reflects, for content in an image corresponding to an object in the scene, the distance (or depth) to the object. For example, the spatial relationship between the camera(s) and the depth sensor can be known, and can be used for correlating the images from the camera(s) with signals from the depth sensor to generate depth data for the images.

As shown in FIG. 1, the system 100 may include or have access to an image management system 140. The image management system 140 may obtain or otherwise access and/or store image content, video content, algorithms, and/or UI content for provision and rendering on a display screen. The image management system 140 includes a depth conflict resolver 142, a range detector 144, and a UI generator 146. The depth conflict resolver 142 may include any number of algorithms to generate and/or modify UI elements to resolve depth conflicts for a user viewing content on a 3D display 110 or 3D display 112, for example. The depth conflict resolver 142 may use the UI generator 146 generate UI elements that function to mitigate, resolve, minimize or otherwise modify a perceived depth conflict.

The range detector 144 may determine a capture volume and comfort range for a user associated with a local 3D system 106, for example. Similarly, a remote range detector may determine a capture volume and comfort range for a user associated with remote 3D system 108, for example. The range detector 144 is configured to determine sightlines of a user viewing content and to determine where particular content may be clipped from an edge of a display, for example. Such determinations can be used to determine whether or not a depth conflict may occur. The remote range detector (not shown) may perform similar functions for a remote device accessing The images captured by the 3D content system 100 can be processed and thereafter displayed as a 3D presentation. As depicted in the example of FIG. 1, 3D image 104' is presented on the 3D display 110. As such, the user 102 can perceive the 3D image 104' as a 3D representation of the user 104, who may be remotely located from the user 102. The 3D image 102' is presented on the 3D display 112. As such, the user 104 can perceive the 3D image 102' as a 3D representation of the user 102.

The 3D content system 100 can allow participants (e.g., the users 102, 104) to engage in audio communication with each other and/or others. In some implementations, the 3D system 106 includes a speaker and microphone (not shown). For example, the 3D system 108 can similarly include a speaker and a microphone. As such, the 3D content system 100 can allow the users 102 and 104 to engage in a 3D telepresence session with each other and/or others. In general, the systems and techniques described herein may function with system 100 to generate image content and/or video content for display amongst users of system 100.

Figure 2:
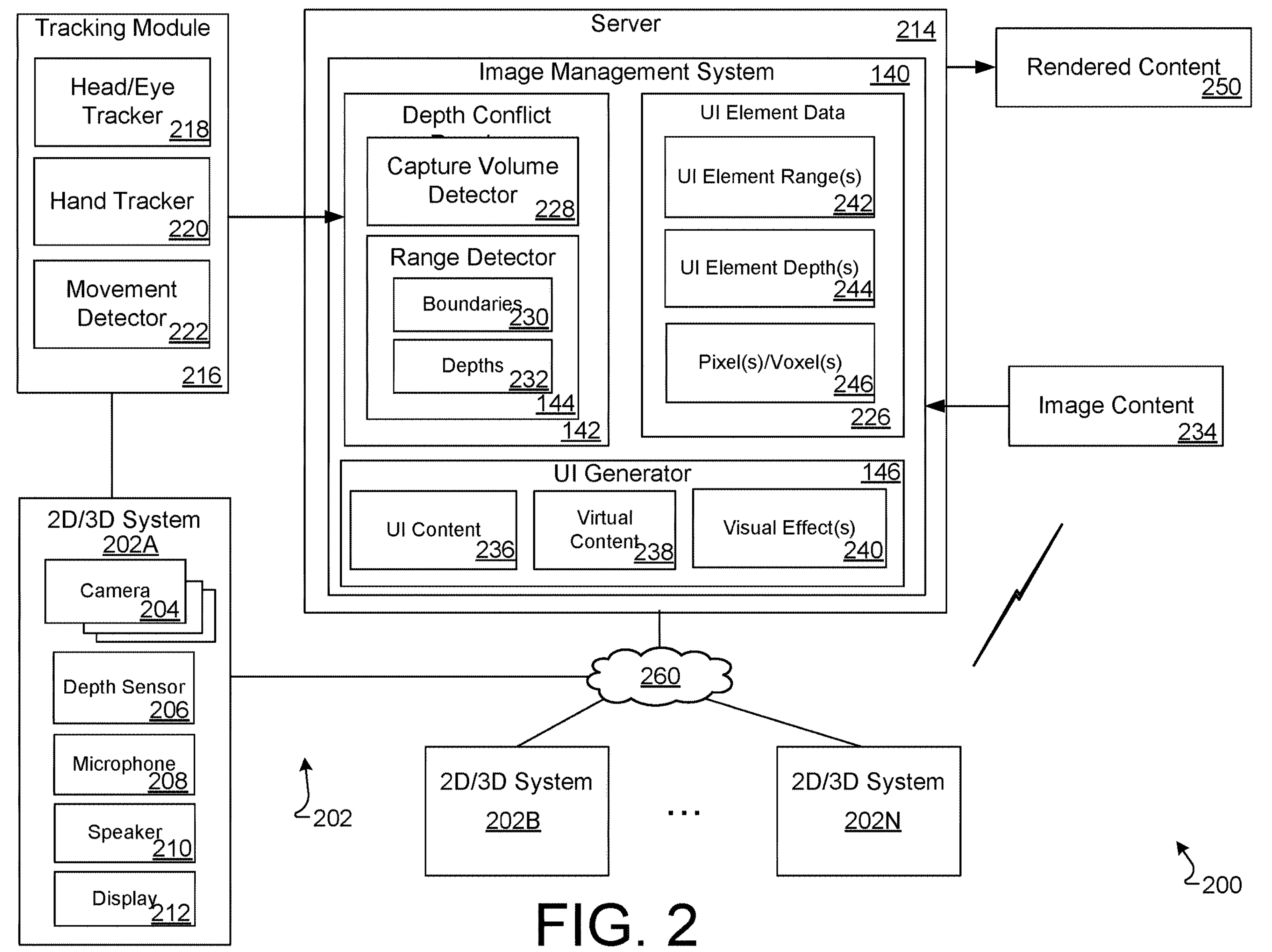
FIG. 2 is a block diagram of an example system for dynamically resolving depth conflict for a stereoscopic display, according to implementations described throughout this disclosure.

FIG. 2 is a block diagram of an example system for dynamically resolving depth conflict for a stereoscopic display, according to implementations described throughout this disclosure. The system 200 can serve as, or be included within, one or more implementations described herein, and/or can be used to perform the operation(s) of one or more examples of synthesizing, processing, modifying, or presentation of the image content described herein. The overall system 200 and/or one or more of its individual components, can be implemented according to one or more examples described herein.

The system 200 may include one or more 3D systems 202. In the depicted example, 3D systems 202A, 202B through 202N are shown, where the index N indicates an arbitrary number. The 3D system 202 can provide for capturing of visual and audio information for a 2D or a 3D presentation, and forward the 2D or 3D information for processing. Such information can include images of a scene (e.g., images and/or video), depth data about the scene, and audio from the scene. For example, the 2D/3D system 202 can serve as, or be included within, the system 106 and 2D/3D display 110 (FIG. 1).

The system 200 may include multiple cameras, as indicated by cameras 204. Any type of light-sensing technology can be used for capturing images, such as the types of images sensors used in common digital cameras. The cameras 204 can be of the same type or different types. Camera locations may be placed within any location on a 3D system such as system 106, for example. In some implementations, the cameras 204 may include a plurality of stereo cameras.

The system 202A includes a depth sensor 206. In some implementations, the depth sensor 206 operates by way of propagating IR signals onto the scene and detecting the responding signals. For example, the depth sensor 206 can generate and/or detect the beams 128A-B and/or 130A-B. In some implementations, the depth sensor 206 is an optional component, for example, in 2D video conferencing applications that do not utilize depth sensing. In some implementations, the depth sensor 206 of any one of the systems 202 may send and receive depths (e.g., depths 232) to server 214 (e.g., executing image management system 140). The system 202A also includes at least one microphone 208 and a speaker 210. In some implementations, the microphone 208 and speaker 210 may be part of system 106.

The system 202 additionally includes a 3D display 212 that can present 3D images. In some implementations, the 3D display 212 can be a standalone display. In some implementations, the 3D display may be a lenticular display. In some implementations, the 3D display 212 operates using parallax barrier technology. For example, a parallax barrier can include parallel vertical stripes of an essentially non-transparent material (e.g., an opaque film) that are placed between the screen and the viewer. Because of the parallax between the respective eyes of the viewer, different portions of the screen (e.g., different pixels) are viewed by the respective left and right eyes. In some implementations, the 3D display 212 operates using lenticular lenses. For example, alternating rows of lenses can be placed in front of the screen, the rows aiming light from the screen toward the viewer's left and right eyes, respectively.

The system 200 includes a server 214 that can perform certain tasks of data processing, data modeling, data coordination, and/or data transmission. The server 214 and/or components thereof can include some or all components described with reference to FIG. 14. In general, the server 214 may receive information from a tracking module 216 which may include a head/eye tracker 218, a hand tracker 220, and/or a movement detector 222, any of which may be received from any one of 2D/3D systems 202. The server 214 may receive such tracking information in order to correct, eliminate, reduce, or otherwise modify particular detected depth conflicts within image content captured by systems 202.

As shown in FIG. 2, the server 214 includes an image management system 140. The image management system 140 may generate 2D and/or 3D information in the form of image content, video content, and/or other UI content. This can include receiving such content (e.g., from the 3D system 202A), processing the content and/or forwarding the (processed and depth corrected) content to another participant (e.g., to another of the 3D systems 202). In some implementations, the image management system 140 may enable delivery of image and/or video content to users via a display device of a computing device.

The image management system 140 includes a depth conflict resolver (e.g., such as depth conflict resolver 142), a UI generator (e.g., such as UI generator 146), and UI element data 226. The depth conflict resolver 142 may analyze capture volume sizes using capture volume detector 228. The depth conflict resolver 142 may also analyze ranges between UI elements and/or ranges between a user viewing content and the depicted content using range detector 144, for example.

The depth conflict resolver 142 may generate and modify particular image content 234 received from any one of 2D/3D systems 202 to ensure that the image content 234 is depicted for systems 202 with proper depth perception. For example, the system 202A may send image content (e.g., video of a user) during a telepresence session with a user of system 202B. The system 202B may assess (e.g., track) a position of a head or eyes of the users of systems 202A and/or 202B to generate UI content 236, virtual content 238, and/or visual effects 240. Generating such content 236, 238, and/or 240 may include accessing image content 234 provided by one or more of systems 202 and modifying such accessed image content 234 with content 236-240 to ensure a comfortable viewing environment for a user of any of systems 202. The modifications of image content 234 with content 236-240 (generated by UI generator 146) element ranges may take into account particular UI element ranges 242, UI element depths 244, and voxels 246, as will be described in detail below.

In some implementations, the depth conflict resolver 142 may analyze image content (e.g., stereoscopic video content) to determine depths 232 associated with the image content 234. In some implementations, determining such depths 232 may include using optical flow techniques to estimate a correspondence between a left eye view and a right eye view of each image frame of the image content 234. The depths 232 may be determined with respect to pixels (and/or generated voxels 246) associated with a particular image frame. For example, the depth sensor 206 and/or cameras 204 may detect particular distances between boundaries 230, objects, portions of objects, UI elements, or other captured content in images and/or video. The depths 232 may be estimated, calculated, or otherwise determined in real time or in near real time.

In some implementations, the system 200 may define a viewing range within a particular capture volume and based on the determined depths associated with captured image content. The viewing range defines a volume in which stereoscopic effects are depicted when viewing the captured image content. In some implementations, the viewing range may refer to a portion of a display screen. In some implementations, the viewing range may refer to an entire display screen if such a screen provides stereoscopic effects throughout the screen.

In some implementations, the viewing ranges and depths may be used to generate voxels that define or model a particular environment associated with displaying the image content. For example, each voxel may represent a cube inside of a 3D model that contains a position inside a 3D grid and a single color value. Each point in the environment may be represented as a voxel that includes volumetric signed data. Surfaces and boundaries associated with the environment and objects (e.g., UI elements, virtual content, etc.) may be rendered by extracting isosurfaces from the volumetric signed data. As image content (e.g., UI elements, objects, and/or surfaces) changes positions within the environment, the content may be re-rendered in order to update a 3D model of the environment. For example, image management system 140 may iteratively generate a surface mesh that represents the volumetric signed data, and that surface mesh may be updated as the volumetric signed data is updated. Similar updates may trigger 3D model updates as new or updated depth information about the environment becomes available.

At some point during playback (e.g., streaming, video session, etc.) of the image content, the image management system 140 may detect a depth conflict occurring in the image content. For example, the depth conflict resolver 142 may detect a depth conflict between the image content and a boundary associated with the viewing range. Such detecting may include determining that at least one portion of the image content (e.g., a user's hand) extends beyond the boundary (e.g., a bottom edge of a display screen) associated with the viewing range. In some implementations, the boundary may refer to an edge of a capture volume.

Responsive to determining the depth conflict, the depth conflict may be resolved for the at least one portion (e.g., the hand) using the viewing range and at least one user interface element. For example, detecting a depth conflict between the at least one portion of the image content (e.g., the hand) and the boundary (the bottom edge of the display screen) may include using at least some of the determined depths associated with the image content to generate a plurality of three-dimensional voxels representing a respective position in a plane of the display depicting the at least one portion. The determined depths may pertain to the portion of the hand that is cut off as the hand extends beyond a boundary edge of the display. The UI element may be a frame element sized based on the determined distance from the hand to the boundary. Such a distance may be selected to ensure that the hand is hidden, thus removing the depth conflict from view of the user viewing the image content. The frame may represent UI content 236 which may be generated and displayed via software within the depicted image content. The UI content 236 (i.e., UI element) may include or be virtual content 238 that is overlaid, underlaid, or otherwise merged with other objects or UI content within the image content. In some implementations, UI elements (e.g., UI content 236) may include virtual content, blurred content, inserted content, and/or other user interface effects for mitigating, resolving, and/or reducing depth conflicts. Visual effects 240 may be applied to further reduce, correct, or eliminate depth conflicts.

The image management system 140 may generate modified image content with the resolved depth conflict. The modified image content may include portions of the image content replaced by the at least one user interface element. In the above example, the UI element may include the frame. Other examples are of course possible, some of which are described in detail throughout this disclosure. The modified image content may be rendered and presented to a user as rendered content 250.

The exemplary components above are here described as being implemented in the server 214, which can communicate with one or more of the 3D systems 202 by way of a network 260 (which can be similar or identical to the network 114 in FIG. 1). In some implementations, the image management system 140 and/or the components thereof, can instead or in addition be implemented in some or all of the 3D systems 202. For example, the above-described depth conflict correction and/or related processing can be performed by the system that originates the 3D information before forwarding the 3D information to one or more receiving systems. As another example, an originating system can forward images, modeling data, pixels, voxels, depth data and/or corresponding information to one or more receiving systems, which can perform the above-described processing. Combinations of these approaches can be used.

The system 200 is an example of a system that includes cameras (e.g., the cameras 204), a depth sensor (e.g., the depth sensor 206), and a 3D content generator (e.g., image management system 140) having a processor executing instructions stored in a memory. Such instructions can cause the processor to identify, using depth data included in 3D information (e.g., by way of a depth processing component), image content in images of a scene included in the 3D information. The processor can generate modified 3D information by detecting depth conflicts and correcting (e.g., resolving) or minimizing such depth conflicts The modified 3D information may be generated from UI elements 226 and image content 234 and may be provided to UI generator 146 to properly generate rendered content 250, for example. Rendered content 250 may be provided to one or more systems 202

The rendered content 250 represents a 3D stereoscopic image (or video portion) of a particular object (e.g., user image) with proper parallax, corrected or eliminated depth conflicts, and viewing configuration for both eyes associated with the user accessing a display device based at least in part on modifications generated by image management system 140, as described herein.

In some implementations, processors (not shown) of systems 202 and server 214 may include (or communicate with) a graphics processing unit (GPU). In operation, the processors may include (or have access to memory, storage, and other processor (e.g., a CPU)). To facilitate graphics and image generation, the processors may communicate with the GPU to display images on a display device (e.g., display 212). The CPU and the GPU may be connected through a high speed bus, such as PCI, AGP, or PCI-Express. The GPU may be connected to the display through another high speed interface such as HDMI, DVI, or DisplayPort. In general, the GPU may render image content in a pixel form. The display 212 may receive image content from the GPU and may display the image content on a display screen.

Figure 3:
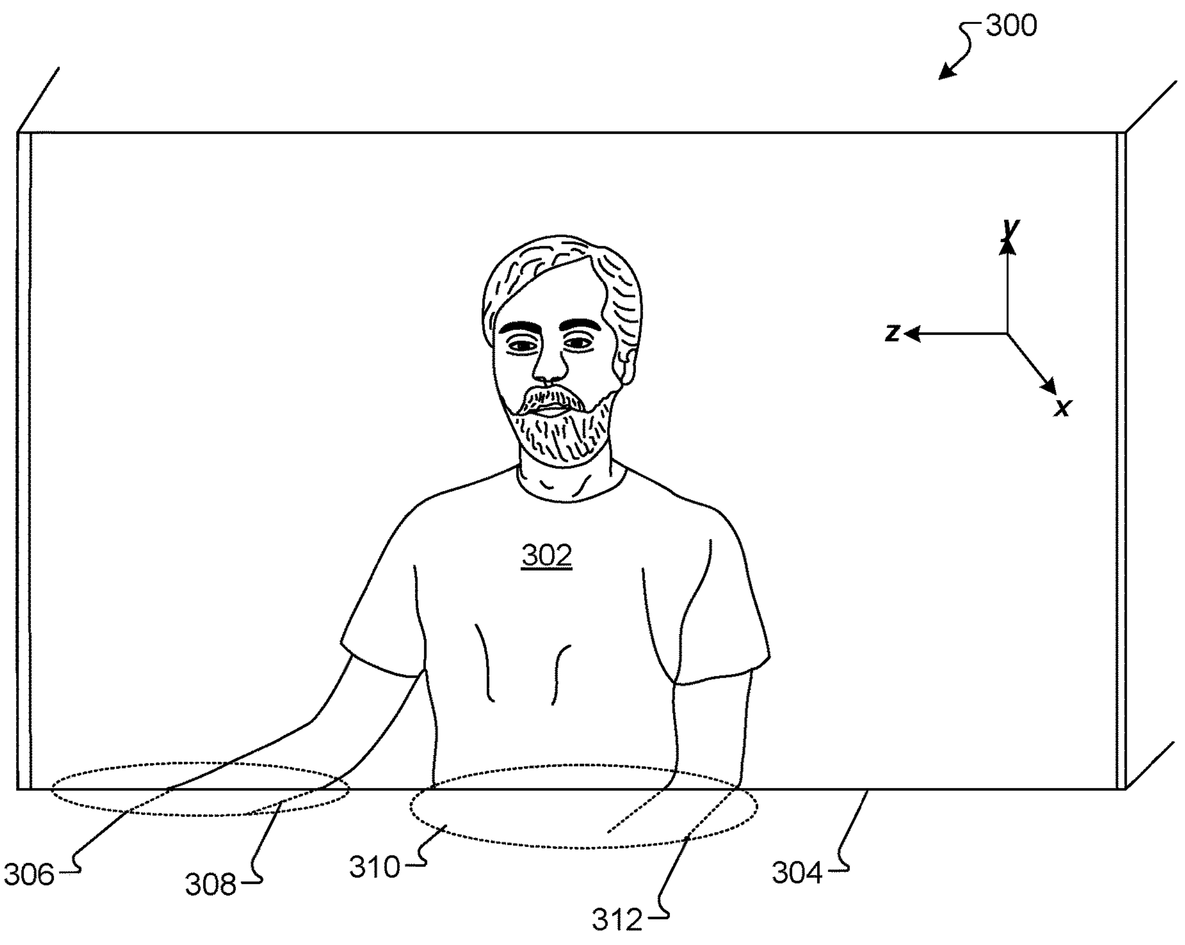
FIG. 3 is an example display device illustrating depth conflict for a user, according to implementations described throughout this disclosure.

FIG. 3 is an example display device illustrating depth conflict for a user, according to implementations described throughout this disclosure. Here, a lenticular display 300 depicts a user 302 during a 3D videoconference session. The display 300 is associated with a particular capture volume in which a remote user may optimally view 3D representations of the user 302. In a 3D representation of the video conference session, the view of the user 302 may extend beyond the bezel of the display at edge 304, which can cause depth conflicts for a user viewing the content shown in display 300. For example, a depth conflict may occur at edge 304 because the user's hands may appear to be cut off at the edge 304 in a 2D representation, but in a 3D representation, digital voxel representations of the hands may appear to extend out beyond the edge 304. Because the hands extend outside of the bounds of the lenticular display from the current viewpoint of the user, the systems described herein may not be able to generate and display the hands. Thus the arms of the user 302 appear in 3D with no hands, as shown by depth conflicts 306, 308, 310, and 312. Such a view may cause a disconnect or conflict in what the viewing user expects to see. Similar depth conflicts may occur at any edge of display 300, for example, if, during the session, the user 302 moves, stands, etc. Such movements may cause one or more portions of the user to extend beyond a border of the display 300. The system 200 may correct, minimize, or remove such depth conflicts.

Figure 4:
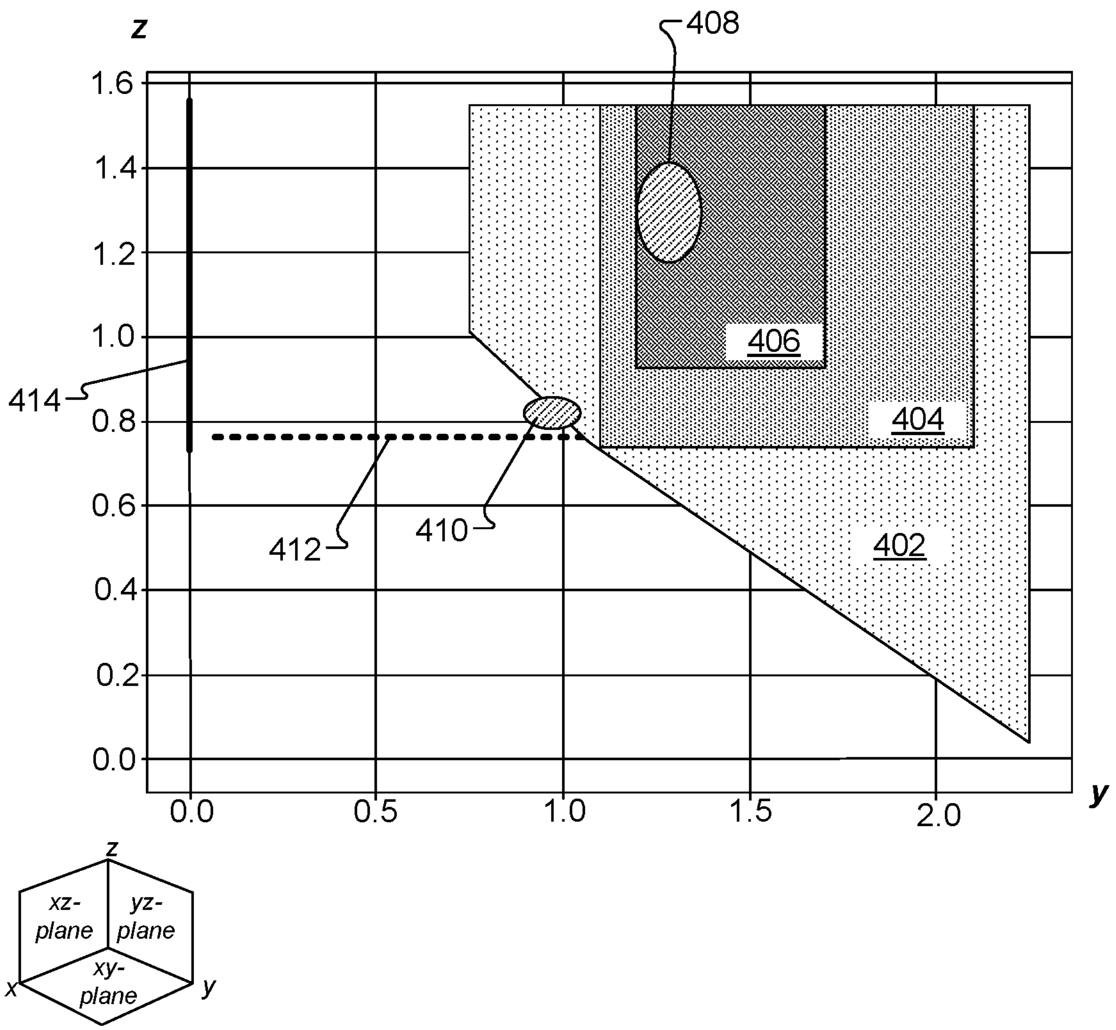
FIG. 4 is a block diagram illustrating an example of a local capture volume and ranges of movement within the capture volume, according to implementations described throughout this disclosure.

FIG. 4 is a block diagram illustrating an example of a local capture volume and ranges of movement within the capture volume, according to implementations described throughout this disclosure. The depicted view shows a representative display screen volume 402 having particular capture volume 404 in the y-z plane. The capture volume 404 represents a local capture volume generated based on a view from a triangulation of captured data from at least three stereo camera pods (e.g., cameras 204). The capture volume 404 includes an optimal viewing range 406. Such a range 406 may be determined using cameras 204, depth sensor 206, and/or range detector 144.

A user being displayed on the capture volume 402 is represented by a head 408 and a hand 410. In this example, the hand 410 is partially captured within volume 402. In this example, the capture volume is shown a distance 412 away from a remote user (not shown). The capture volume is shown at a height 414. Such measurements are configurable depending on the display screen size and the capture volume defined by the cameras capturing image content.

Figure 5:
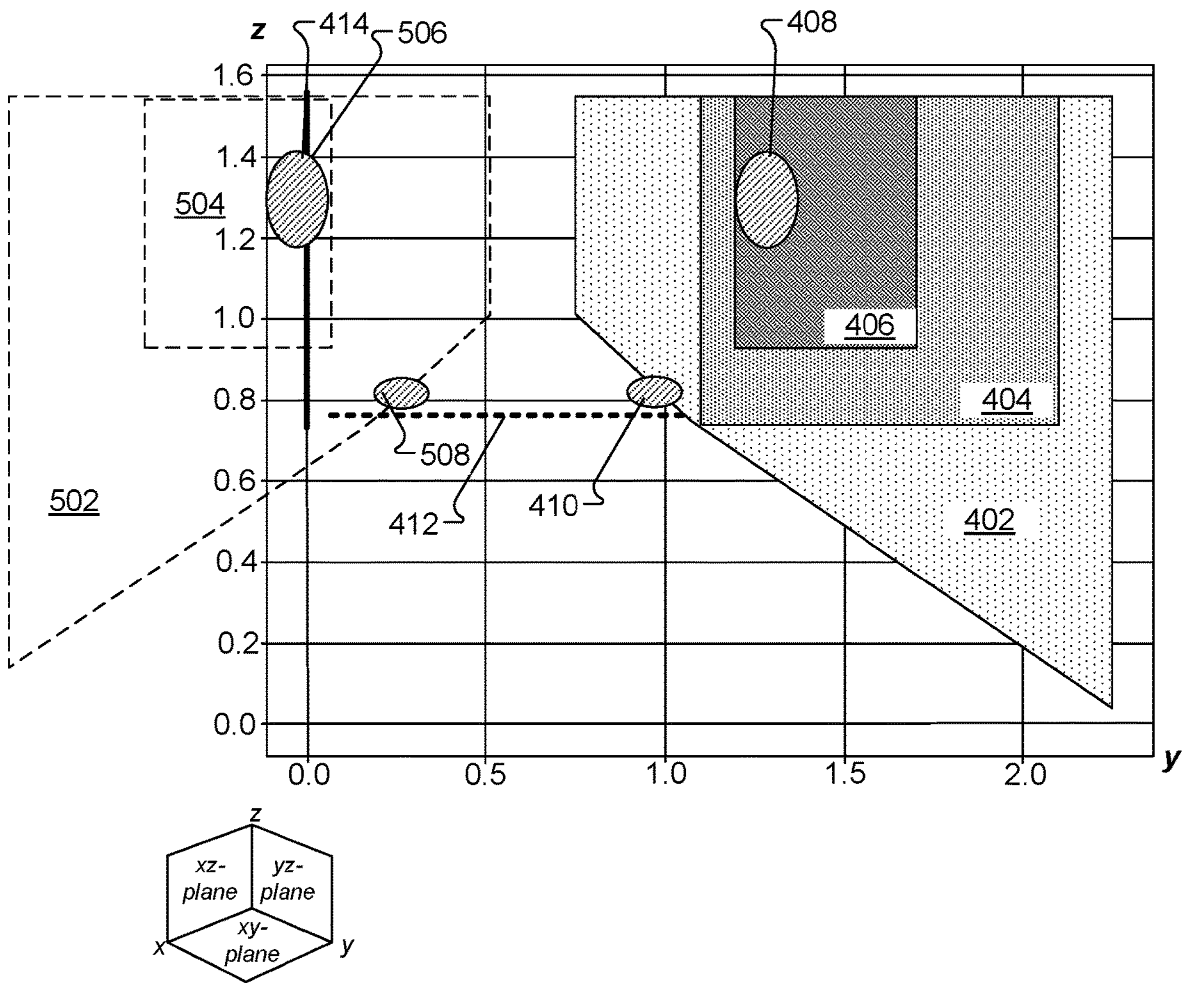
FIG. 5 is a block diagram illustrating an example of a remote capture volume with respect to a local capture volume, according to implementations described throughout this disclosure.

FIG. 5 is a block diagram illustrating an example of a remote capture volume 502 with respect to a local capture volume, according to implementations described throughout this disclosure. The remote capture volume 502 may be approximated to calculate depth conflicts, for example, by flipping the capture volume 402 in the z plane and shifting the volume by about 1.25 meters to about 1.35 meters. The remote capture volume 502 includes an optimal viewing range 504. A remote user is approximated by a head 506 and a hand 508. Similar to hand 410, the hand 412 of the remote user is also clipped by a bottom edge of the capture (approximated by capture volume 502). This clipping may cause a depth conflict for a user viewing the remote user (i.e., represented by head 506 and hand 508). In this example, the two represented capture volumes 402 and 502 are placed a distance 412 from one another. The distance 412 may mimic a user standing about four to eight feet from another user to engage in a conversation as if in the physical presence of the user. The content captured and displayed on representative display screen volume 402 may be displayed to a remote user to replicate such physical presence. Similarly, the content captured and displayed on representative display screen volume 502 may be displayed to the user of screen volume 402 to replicate the same physical presence.

Figure 6:
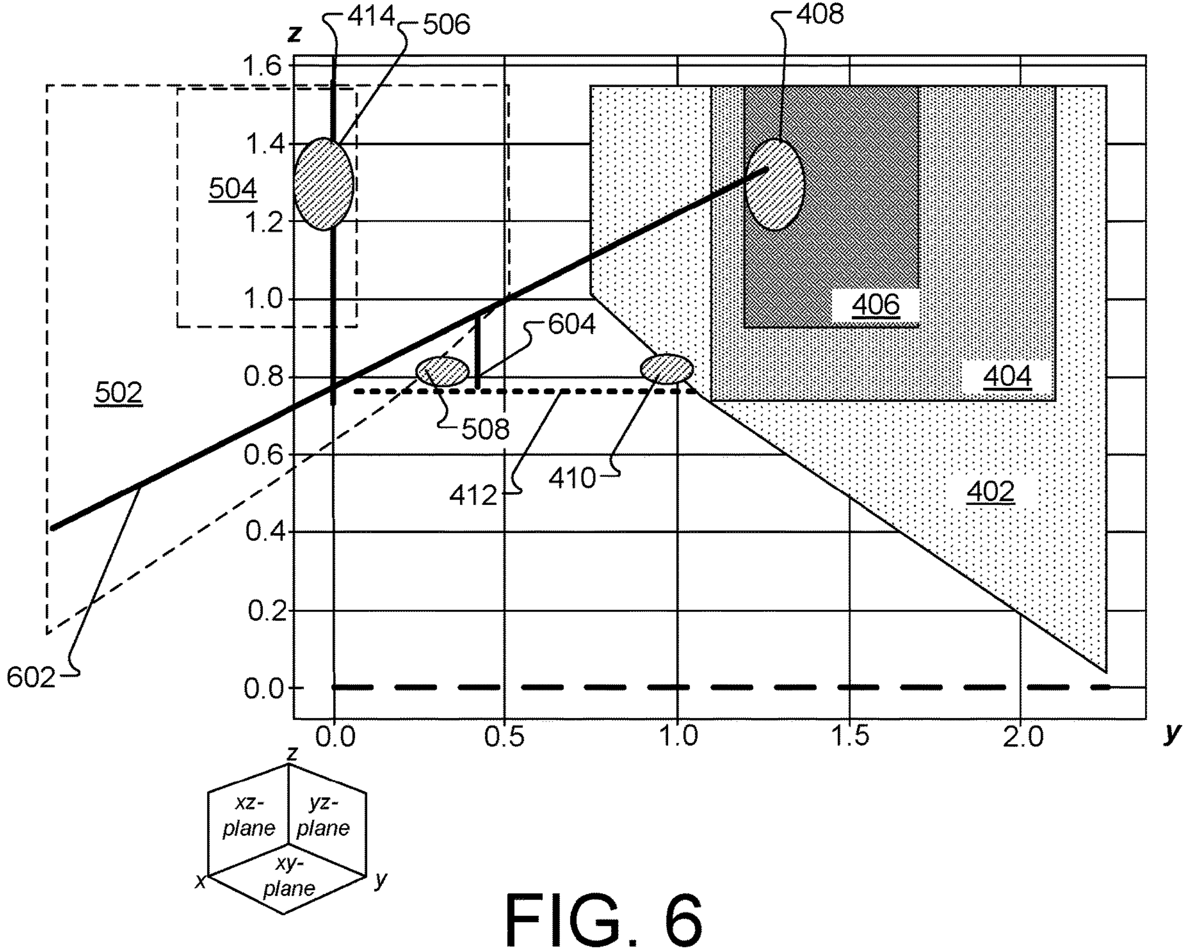
FIG. 6 is a block diagram illustrating an example of a display edge clipping of a capture volume, according to implementations described throughout this disclosure.

FIG. 6 is a block diagram illustrating an example of a display edge clipping of a capture volume, according to implementations described throughout this disclosure. In this example, a user sightline 602 is determined (i.e., based on user head 408). The sightline 602 indicates that the entire hand 508 of a remote user (as being viewed by user head 408) may be clipped by the display edge of the display represented by volume 502. In such a case, a depth conflict may occur at the bottom edge of the display represented by volume 502.

The image management system 140 may generate a solution to resolve or minimize the detected depth conflict. For example, the system 140 may generate a dark colored window or frame to hide the depth conflict. In some implementations, hiding the depth conflict includes resolving the depth conflict by animating at least one user interface element to hide at least one portion of the image content with modified image content. In some implementations, a floating black bar 604 may be rendered at z=0.4 meters along the bottom edge of the display screen, thus creating the perception that an object (e.g., the bar 604) between the subject (e.g., user head 408 and the viewer is clipping the view, but because the bar 604 is dark and recesses the view, a depth conflict will not be perceived by the user.

Figure 7A:
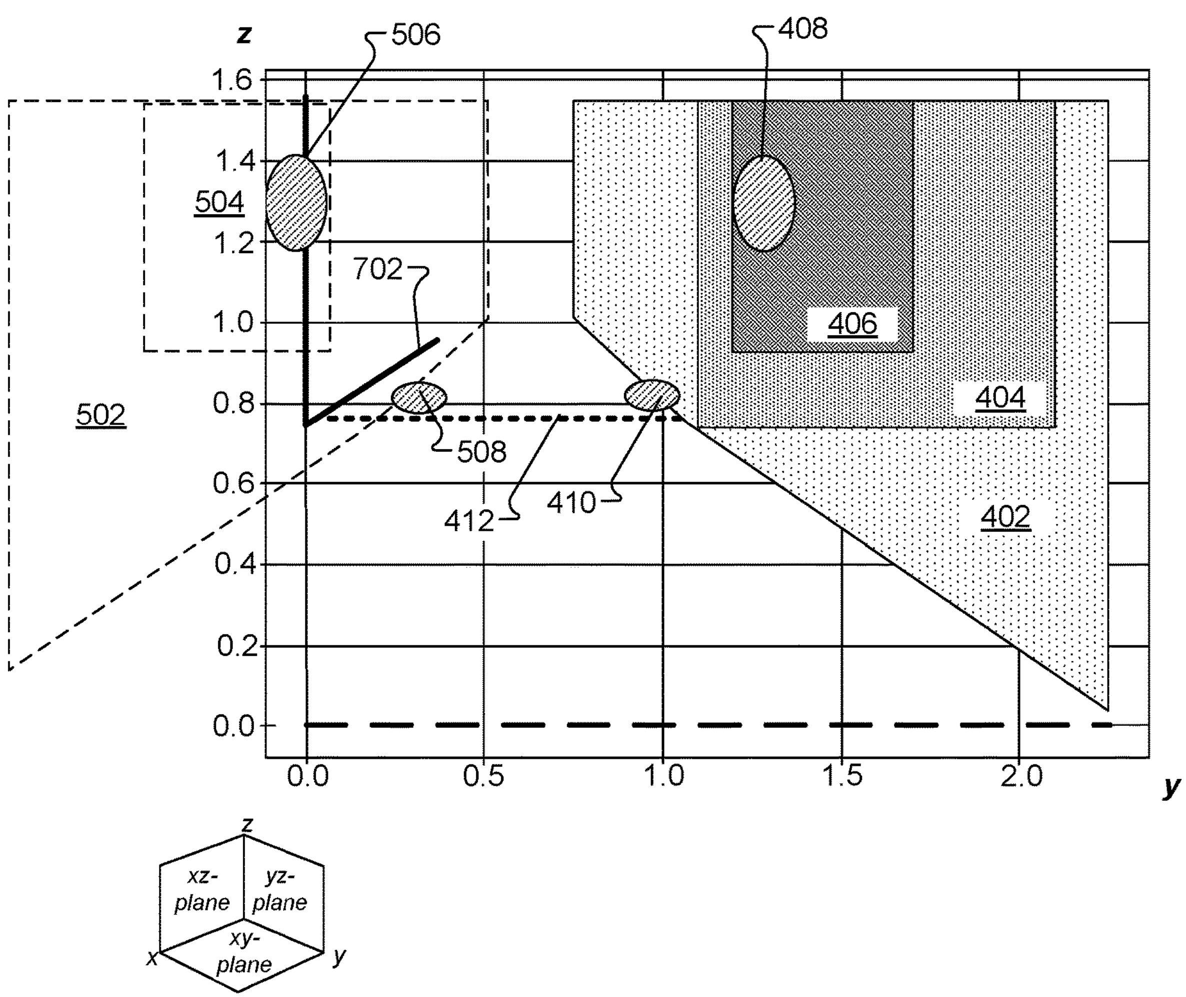
FIGS. 7A-7C are block diagrams illustrating examples of visually perceived tilt of a display device, according to implementations described throughout this disclosure.
Figure 7B:
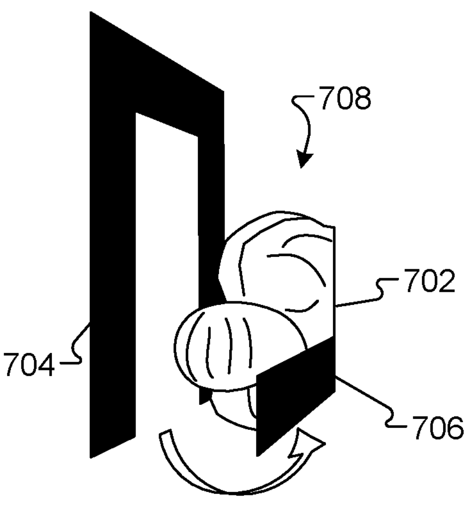
Figure 7C:
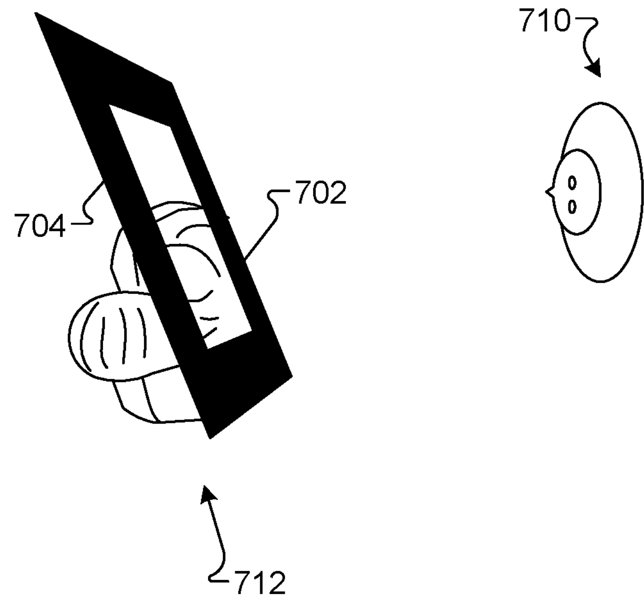

FIGS. 7A-7C are block diagrams illustrating examples of visually perceived tilt of a display device, according to implementations described throughout this disclosure. In FIG. 7A, another perspective of the bar 604 is shown by bar 702. A top edge of the black bar 702 may be perceived to land at z=0.4 meters because of how the clipping changes as the head 408 is moved. The bottom edge of volume 502 may be ambiguous and because there is no internal detail for parallax cues within the black bar 702, it can be perceived at different depths. If the display frame bar 702 is black, the lower edge of the bar 702 may be perceived by the user to land at z=0 meters and in such cases, the bar 702 may be perceived as tilted.

Referring to FIG. 7B, a frame bar solution to alleviate the depth conflict is illustrated. The solution includes the use of a frame 704 superimposed as a UI element around the image content. In this example, a portion 706 of a window frame 704 is placed in front of the image content 708 while the remainder of the frame 704 is located behind the image content 708.

While the frame 704 and portion 706 appear in different planes, a user 710 as shown in FIG. 7C, when viewing the image content on a display device, for example, will perceive that the frame and image content as angled (e.g., tilted), as shown by content 712. This illusion may correct the previously perceived depth conflict.

Figure 8A:
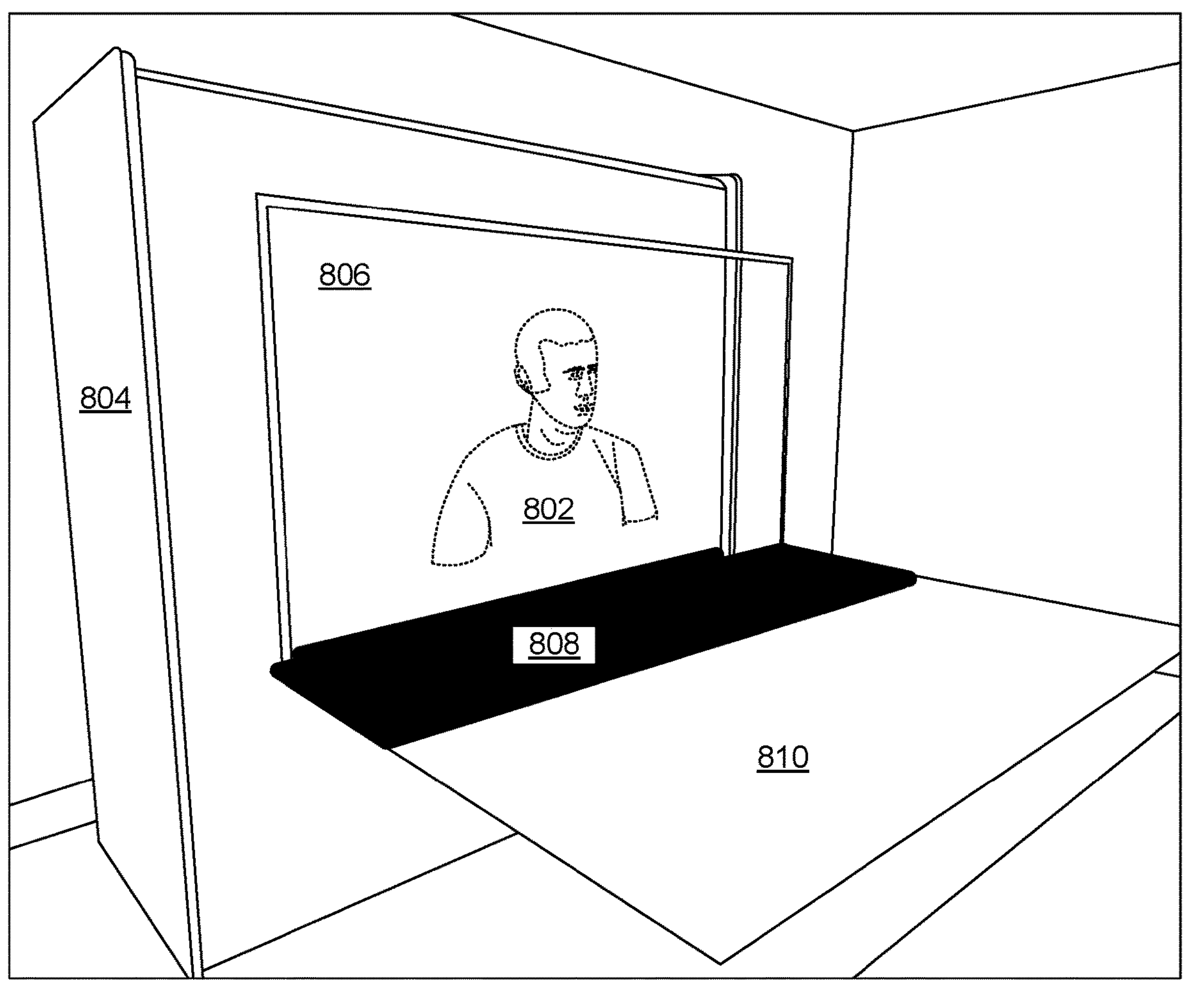
FIGS. 8A-8B are block diagrams illustrating examples of resolving depth conflict with synthesized image content, according to implementations described throughout this disclosure.
Figure 8B:
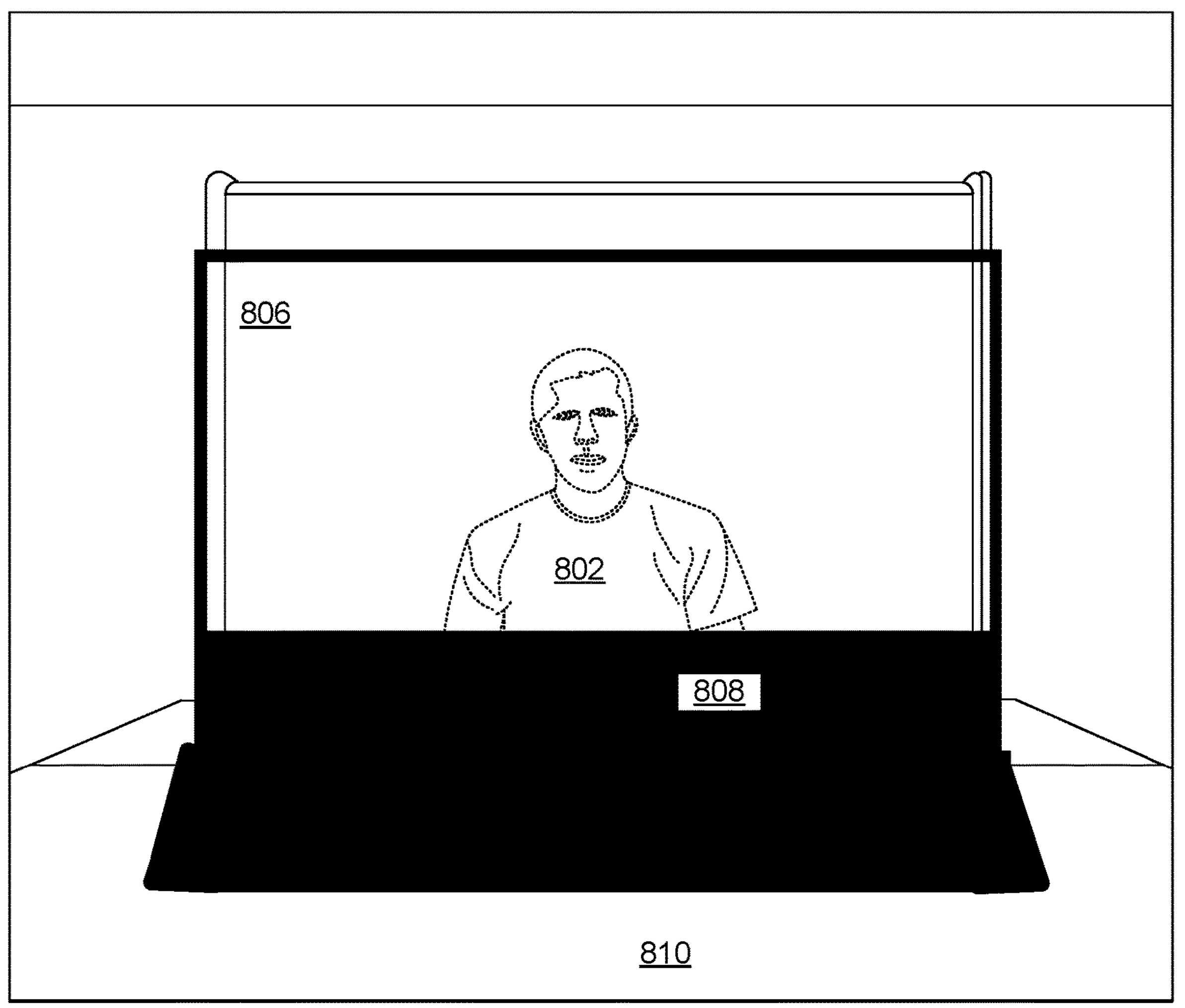

FIGS. 8A-8B are block diagrams illustrating examples of resolving depth conflict with synthesized image content, according to implementations described throughout this disclosure. As shown in FIG. 8A, a user 802 is depicted as image content in a 3D videoconference session on a telepresence apparatus 804 housing a display screen 806, as described with respect to FIG. 1. To correct for depth conflicts that may occur at the bottom edge of display screen 806, a portion 808 of a desk 810 may be physically painted to appear as if the desk 810 has a dark stripe.

As shown in FIG. 8B, the dark stripe 808 may appear tilted and floating to a user viewing content on display 806 at perpendicular (or near perpendicular) angle to the display screen 806. Such a configuration may correct or eliminate the depth conflict that may occur with cutting off portions of the displayed user 802

Figure 9A:
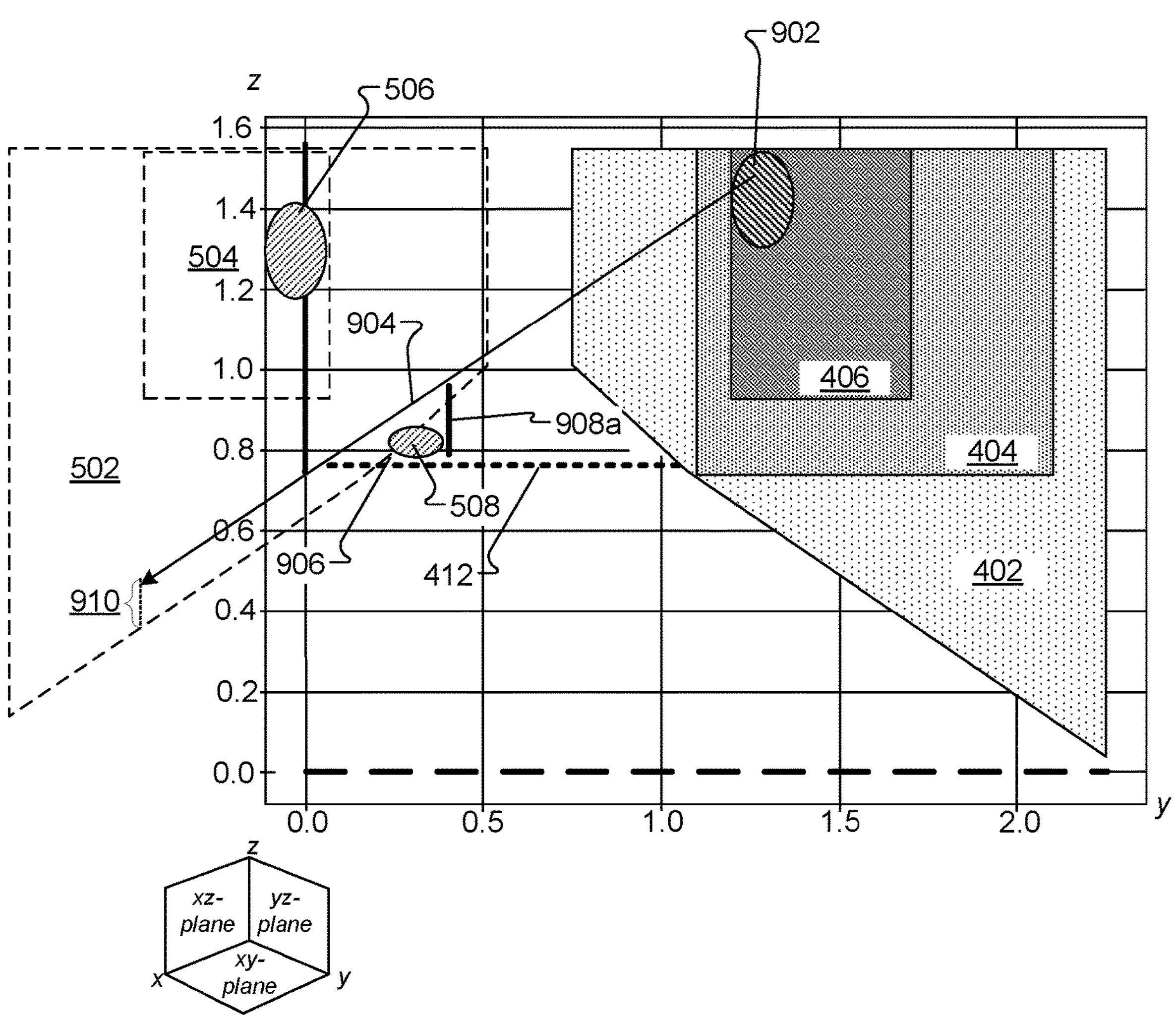
FIGS. 9A-9B are block diagrams illustrating examples of resolving depth conflict by dynamically adjusting the display window of a display device, according to implementations described throughout this disclosure.
Figure 9B:
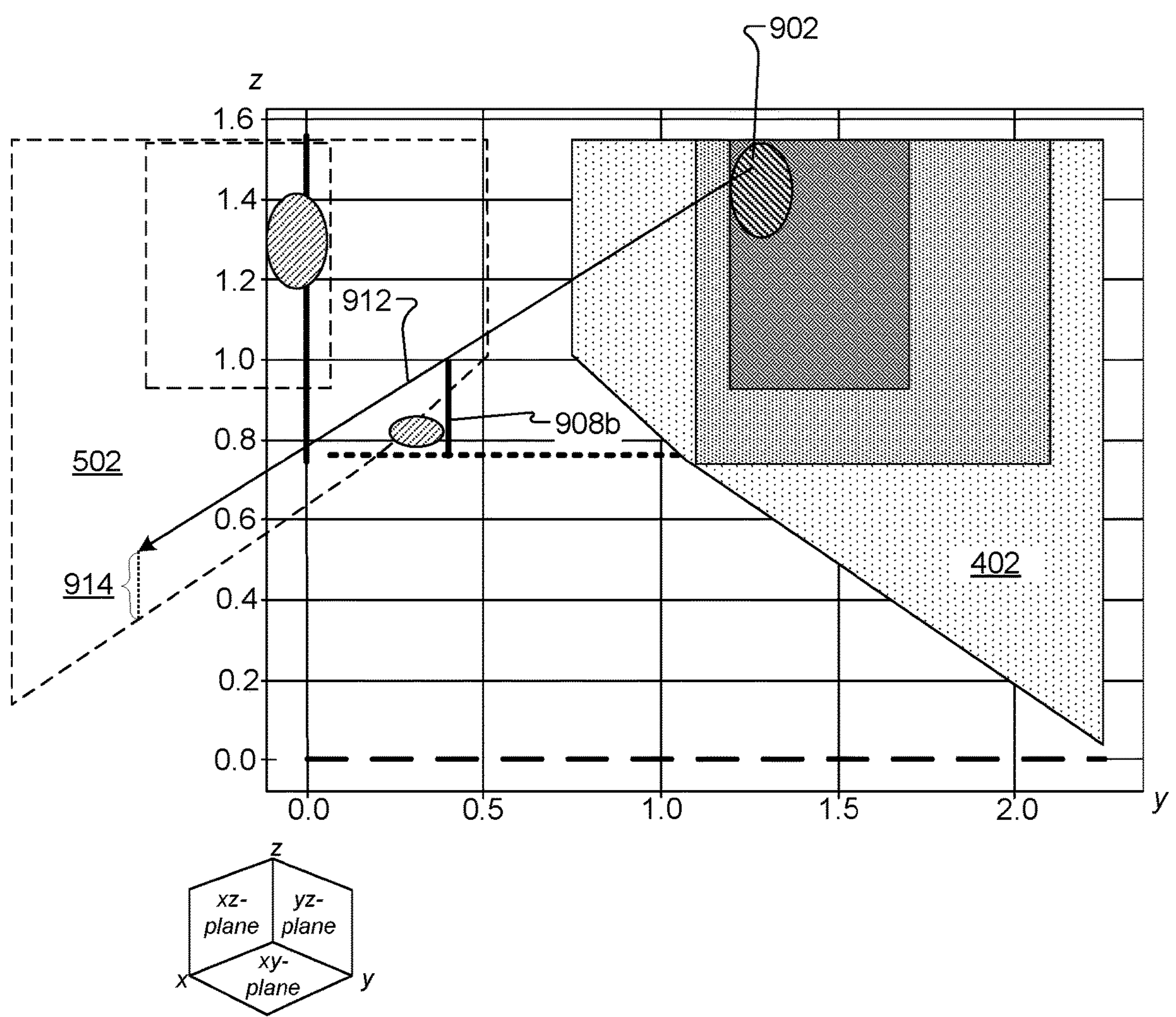

FIGS. 9A-9B are block diagrams illustrating examples of resolving depth conflict by dynamically adjusting the display window of a display device, according to implementations described throughout this disclosure. As shown in FIG. 9A, a capture volume 404 includes an optimal viewing range 406. Similarly, a user is displayed on the display screen volume 402 is represented by a head 902. In this example, a wrist or upper arm is partially captured within volume 402, which causes a portion of captured content to be clipped by a display edge. In this example, the capture volume 402 is shown a distance 412 away from a remote capture volume 502 including a user represented by head 506 and wrist 508. In this example, the user (i.e., head 902) may be standing and thus at a top portion of optimal viewing range 406. Because the head 902 is higher in the capture volume 406 than when the user is seated (or of shorter height), a depth conflict may be perceived when viewing portions of a remote user or remote content shown in capture volume 502, as shown by viewing angle 904. Such a viewing angle 904 may, for example, view a depth conflict associated with wrist 508 because the wrist may be perceived as missing when head 902 views the remote content in capture volume 502. For example, the depth conflict may be determined to occur based on a tracked head position (of head 902) of a local user viewing remote content (in capture volume 502). For example, the depth conflict may be determined by depth sensor 206 of system 202A viewing content received from system 202B. Both systems 202A and 202B may include lenticular display devices with four or more edge boundaries where depth conflicts can be determined to occur if, for example, user movements including head position changes occur. In the depicted example, a frame 908*a* may include a windowed opening surrounding, encompassing, and/or overlaying the content depicted in capture volume 502 of FIG. 9A, which ensures that sightline 904 rests above the content (e.g., wrist 508) that may cause the depth conflict as shown by a distance 910 from a bottom edge of the capture volume 502 to the inner edge of the frame 908*a*.

To correct for the detected depth conflicts described above, the depth conflict resolver 142 may work with UI generator 146 to provide a visual effect 240, as shown in FIG. 9B to correct for additional movement of the user. For example, the depth conflict resolver 142 may determine and trigger a visual effect that raises a frame portion extending from a bottom edge of the capture volume 502 to a higher fixed position to eliminate the depth conflict with viewing the wrist 508. The frame portion may include a frosted area or volume or a blurred area or volume to eliminate the depth conflict.

In some implementations, the depth conflict resolver 142 may trigger a resizing of a particular user interface element. For example, the UI element data 226 may include information about range 242, depth 244, and/or voxels 246 about the frame UI element. Such information can be used to resize the frame. Thus, the depth conflict resolver 142 can trigger a resizing of the frame (e.g., a window surrounding, encompassing, and/or overlaying content) that is associated with the content depicted in capture volume 502 upon determining that the tracked head position of head 902 has moved to a location that may generate one or more depth conflicts. The resizing of frame 908*a* to 908*b* is indicated by a sightline 912 (modified from sightline 910) and a distance 914 from a bottom edge of the capture volume 502 to the inner edge of the frame 908*b*. In this example, the distance 908*b* is increased from distance 908*a* to avoid the depth conflict.

In some implementations, the depth conflict resolver 142 may work with the range detector 144 to determine particular boundaries 230 and/or depths 232 associated with objects near or at the boundaries 230. For example, the depth conflict resolver 142 may detect a depth conflict between a portion of the image content and a boundary 230 (e.g., the wrist 508 at boundary 906) associated with a viewing range by using at least some of the determined depths for wrist 508 associated with the image content in volume 502. The depth conflict resolver 142 can use the depths for wrist 508 to generate a plurality of three-dimensional voxels (described above) representing a position of the wrist 508 in the plane of a display depicting the wrist, for example. In some implementations, the user interface element may be a frame, a blurred wall, or other UI element selected based on the distance (e.g., the distance between the wrist outside the boundary to the boundary.

In some implementations, the visual effects 240 may determine a speed in which to perform the resizing of the frame (e.g., from 908*a* to 908*b*). For example, the depth conflict resolver 142 may determine whether a user is seated, standing, actively moving, etc. and may select a speed of frame resize, accordingly. Similarly, the actual amount of resizing of the frame (smaller or larger) may be selected using range detector 144, and UI element data 226.

Figure 10A:
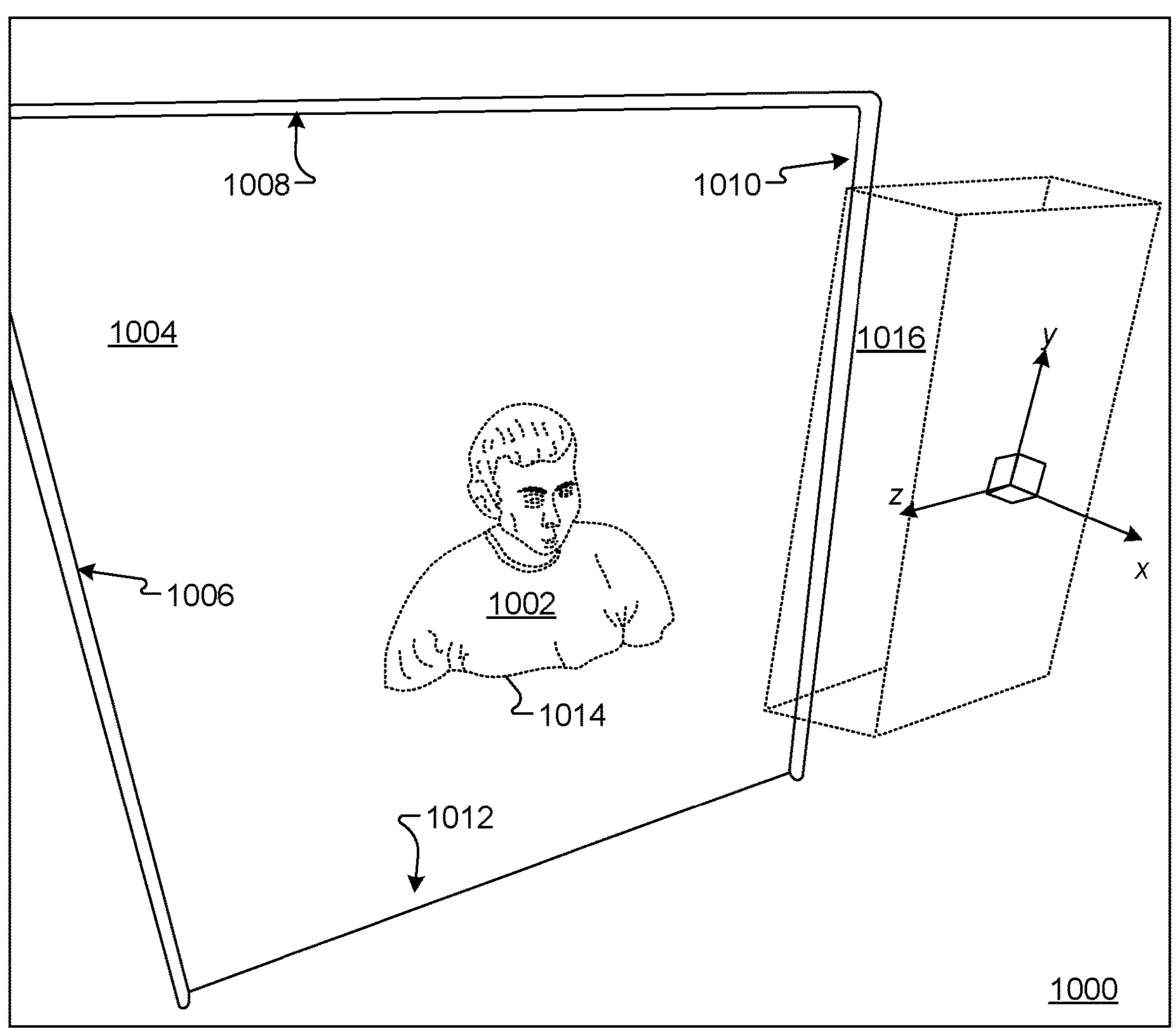
FIGS. 10A-10G are block diagrams illustrating examples of resolving depth conflict by adjusting boundaries and/or edges, according to implementations described throughout this disclosure.

FIGS. 10A-10G are block diagrams illustrating examples of resolving depth conflict by adjusting boundaries and/or edges of capture volumes, according to implementations described throughout this disclosure. FIG. 10A depicts a portion of a room 1000 housing telepresence display equipment with a user 1002 within a display screen 1004.

If no depth conflict management were provided by image management system 140, the boundary edges 1006, 1008, 1010, and 1012 may cause depth conflicts for a user viewing user 1002 (or viewing content within screen 1004) if portions of the user 1002 were clipped by the edges. Similarly, depth conflicts may be perceived by users viewing user 1002 (or viewing content within screen 1004) at portions of image content that appear to float, such as boundary 1014.

In some implementations, the image management system 140 may trigger visual effects 240 and/or virtual content 238, and/or UI content 236 to mitigate or correct the depth conflicts occurring at such borders and boundary edges. For example, the depth conflict resolver 142 may generate a grid-textured blurred wall 1016 for a particular boundary of the screen 1004 to obfuscate the boundary edges to ensure that users viewing content in screen 1004 may not view around and beyond the boundary edges of screen 1004. Although wall 1016 is shown on a single boundary of screen 1004, any or all boundaries of screen 1004 may include a blurred wall, such as wall 1016. In some implementations, the depth conflict resolver 142 may generate additional pixels (e.g., areas and/or volumes) to be blurred throughout screen 1004 to prevent depth conflicts.

Figure 10B:
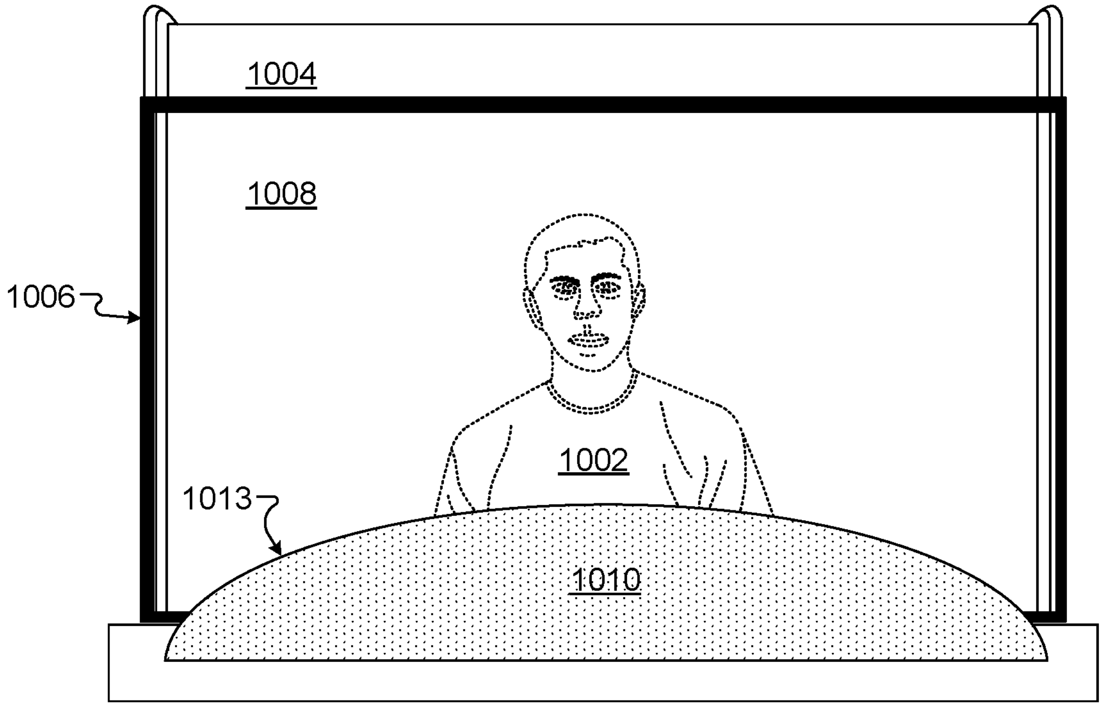

Referring to FIG. 10B, the user 1002 is shown with screen 1004 and a frame 1006 to define a capture volume 1008. In this example, the depth conflict resolver 142 may generate a frame to encompass any portion of capture volume 1008 to ensure that depth conflicts are minimized or eliminated. In this example, the frame 1006 may be generated by image management system 140 via UI generator 146, for example.

Figure 10C:
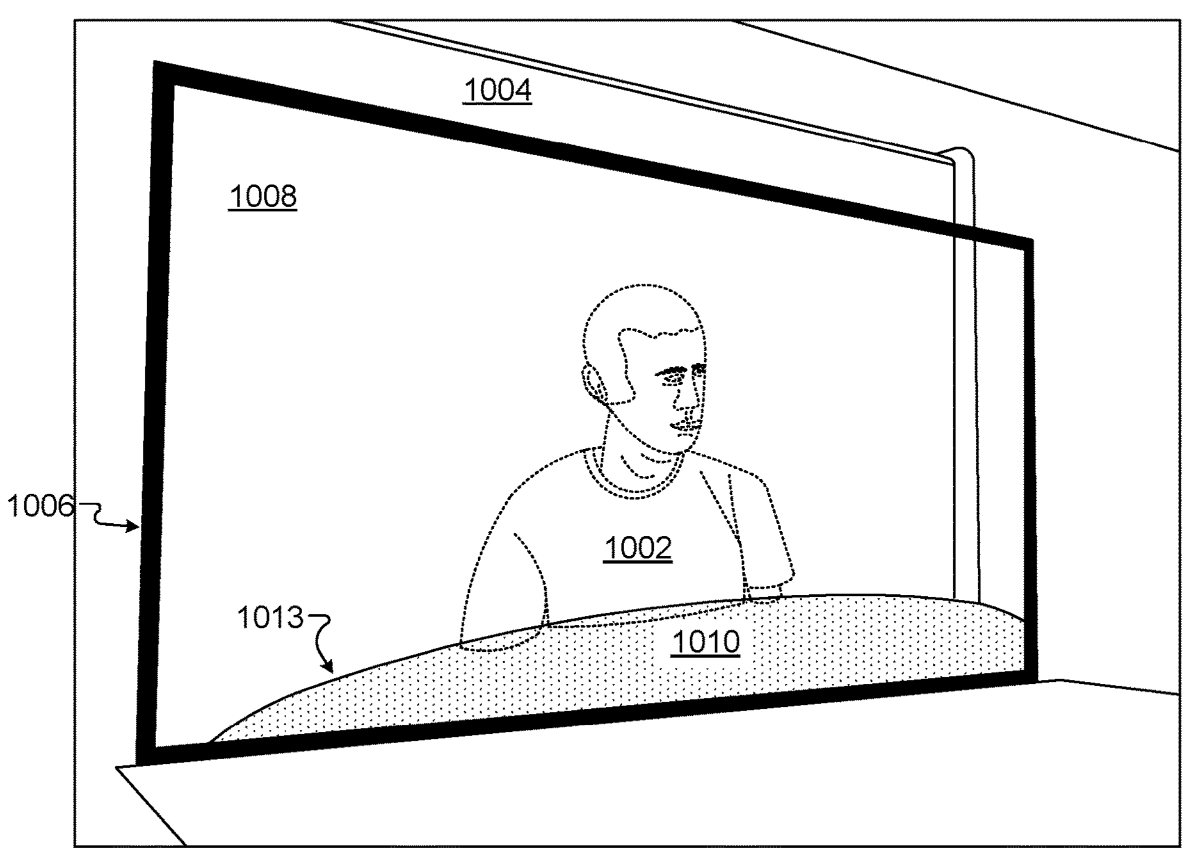

The depth conflict resolver 142 also generated a blurred shape 1010. The blurred shape 1010 may be blurred with partial transparency of content being blurred to make a remote view of user 1002 appear expansive, thereby increasing the feeling of presence for the remote user viewing user 1002. In this example, a radius 1013 of the blurred shape 1010 is selected to encompass less real estate of volume 1008 where content is not being depicted. Although the blurred shape 1010 is a partial oval, other shapes are, of course, possible. In some implementations, the surface of the blurred shapes described herein are angled so that z=0 at a bottom edge of the blurred shape. For example, the blurred shape 1010 is shown in FIG. 10C at an angle with the same radius 1013.

Figure 10D:
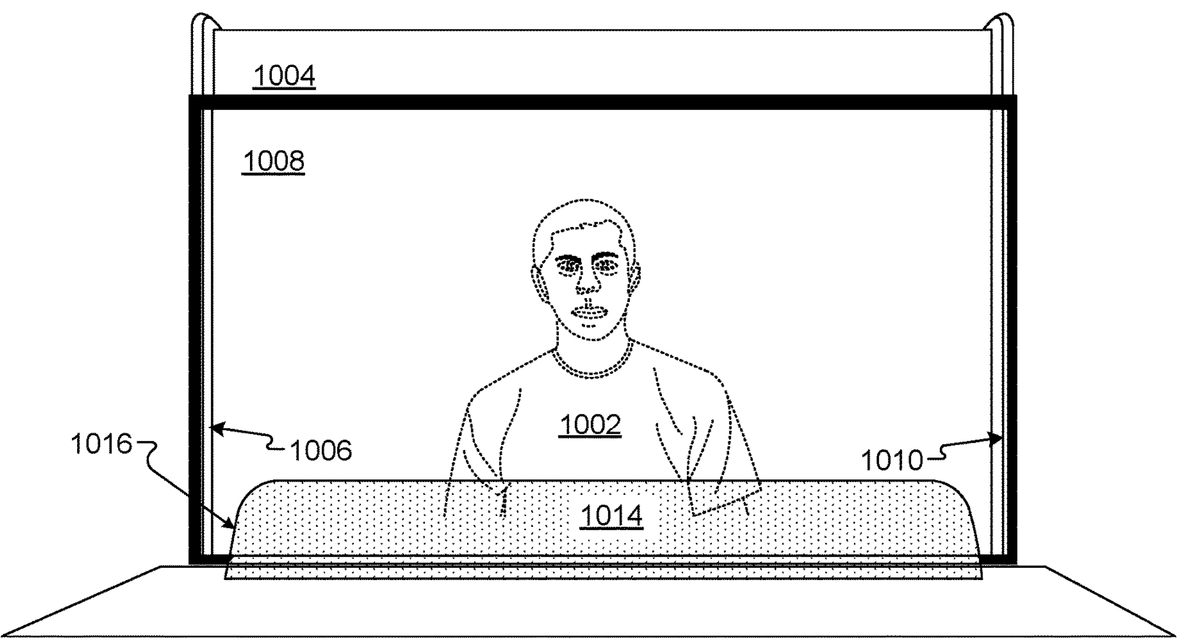

Referring to FIG. 10D, another example UI element/shape to mitigate depth conflicts when observing content within volume 1008 includes a blurred shape 1014. The blurred shape 1014 is a frosted, partially transparent, half angled trapezoid. In particular a surface of shape 1014 may be angled and rounded 1016 to provide sideways shift to prevent clipping by left and right display boundaries 1006 and 1010.

Figure 10E:
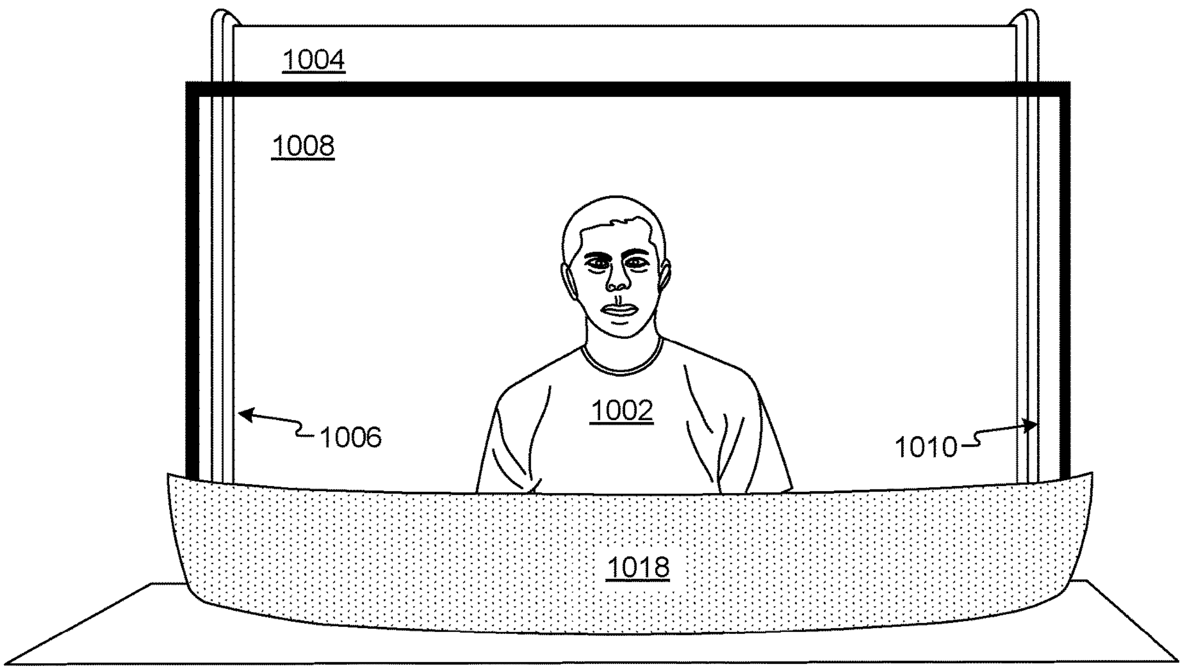

Referring to FIG. 10E, another example UI element/shape to mitigate depth conflicts when observing content within volume 1008 includes a blurred shape 1018. The blurred shape 1018 is a frosted, partially transparent shell which provides for additional content to be displayed in a front and center portion of the volume 1008 near the shape 1018 while confining the bottom portion on the side boundaries of the volume 1008.

Figure 10F:
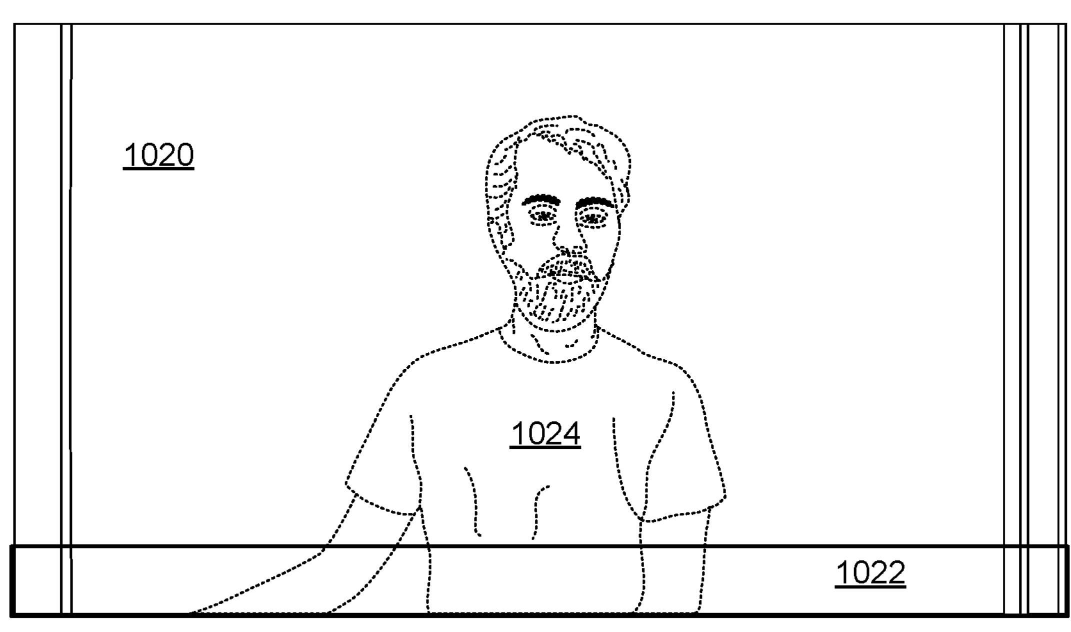

Referring to FIG. 10F, another example UI element to mitigate (e.g., hide, remove, correct) depth conflicts when observing content within a volume 1020 includes a shape 1022. The shape 1022 and size of the shape 1022 may be determined by the depth sensor 206, which may detect a possible depth conflict when image and/or video content is being depicted in volume 1020. In this example, the sensor 206 may provide depths 232 to depth conflict resolver 142. Resolver 142 may determine particular areas in which the depth conflict may appear for a particular user viewing the content being depicted in volume 1020. For example, resolver 142 may function with a depth sensor and cameras on another system 202 to determine head pose data associated with particular capture data. Such data may be used to dynamically calculate depth conflicts in order to determine whether a depth conflict will be visible on the display device depicting volume 1020, for example.

Figure 10G:
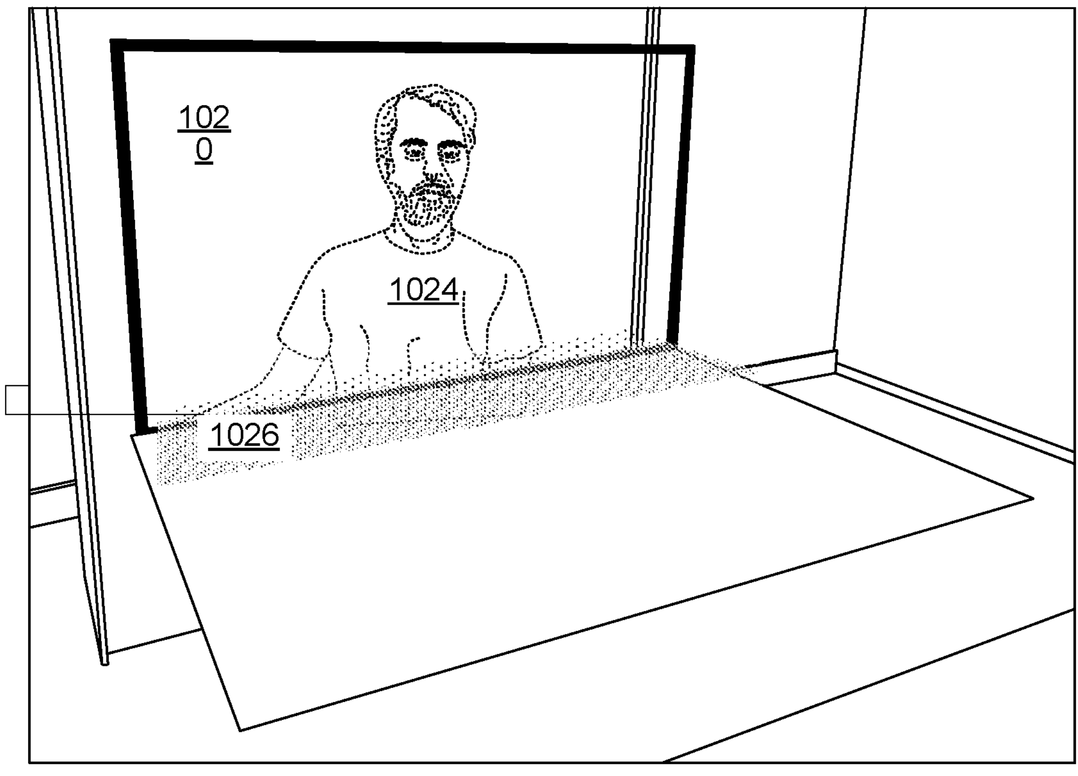

Referring to FIG. 10G, the depth conflict resolver 142 determined that portions of the arms of a user 1024 may cause particular depth conflicts. In response, the depth conflict may be mitigated as needed. For example, animations via visual effects 240 may be faded in or out based on a particular detected depth conflict. In some implementations, the selected shapes, such as shape 1026 may have a gradient blur. In this example, the image management system 140 using UI generator 146, for example, may use a distortion map to generate a blur radius that increases toward a bottom boundary of the capture volume 1020, as shown in shape 1026.

The shape 1026 may be generated upon detecting user 1024 moving forward. For example, as the user 1024 moves forward, the image management system 140 (e.g., using a shader) detects a depth conflict on a lower boundary of the volume 1020 and triggers UI generator 146 to generate visual effects 240 to fade the blur and opacity for the frosted shape 1026. In some implementations, a similar transition may be used for the side walls in the boundary system for limbs or objects outside the capture volume 1020.

The blurred shape 1022 is a frosted, partially transparent shell which provides for additional content to be displayed in a front and center portion of the volume 1008 near the shape 1018 while confining the bottom portion on the side boundaries of the volume 1008.

Figure 11:
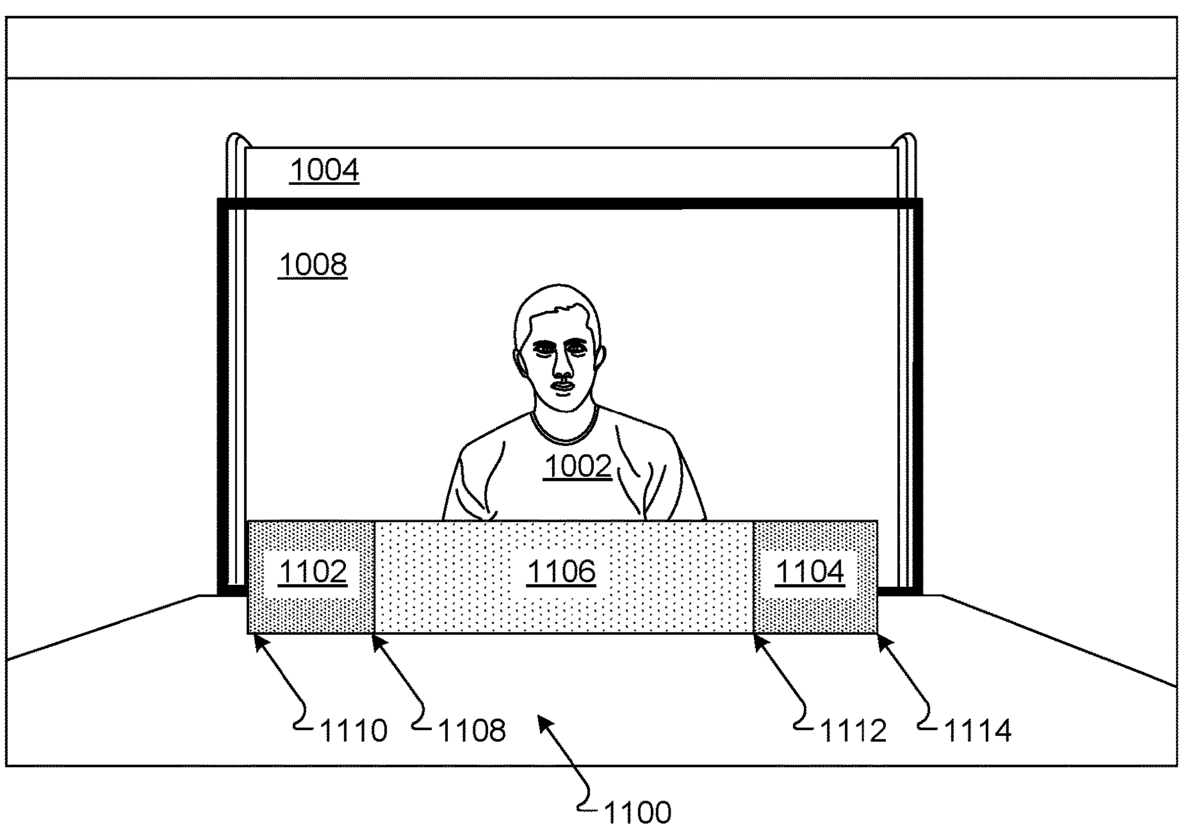
FIG. 11 is a block diagram illustrating an example of resolving depth conflict using segmented virtual content, according to implementations described throughout this disclosure.

FIG. 11 is a block diagram illustrating an example of resolving depth conflict using segmented virtual content, according to implementations described throughout this disclosure. Here, a segmented front depth conflict mitigation is shown. The display 1004 is shown with capture volume 1008. If a large frosted wall appearing in front is too visually distracting when hands briefly enter the boundary zone, the image management system 140 may trigger depth conflict resolver 142 via UI generator 146 to generate a segmented grid element 1100 and fade sections in and out, as is deemed comfortable for a user. Such a segmented grid element 1100 may include blurred portions 1102 and 1104 as well as semi-opaque portions 1106. Such a UI element may also provide coverage for a permanent object being depicted in volume 1008, such as a laptop on a desk.

In some implementations, the grid element 1100 may be a blurred overlay with a gradient blur graduating from a left central portion 1108 of the overlay (e.g., grid element 1100) to a left edge 1110 of the image content and from a right central portion 1112 of the overlay to a right edge 1114 of the image content.

Figure 12:
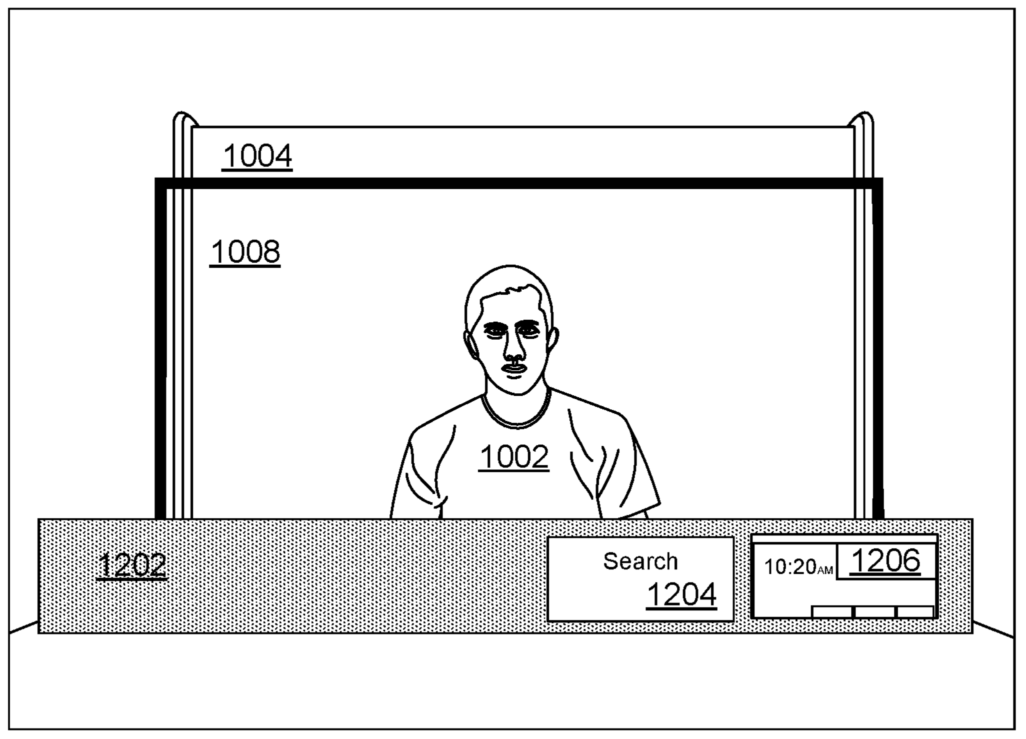
FIG. 12 is a block diagram illustrating example application content placed on virtual content, according to implementations described throughout this disclosure.

FIG. 12 is a block diagram illustrating example application content placed on virtual content, according to implementations described throughout this disclosure. In this example, a shaped semi-transparent UI element 1202 is depicted to mitigate particular detected depth conflicts. For example, the UI element 1202 may be blurred, partially blurred, or semi-transparent. Such elements may be shaped based on the display volume 1008, the content being covered, or the particular detected depth conflict. For example, although the UI element 1202 is depicted as a rectangle, other shapes are possible.

The UI element 1202 may be used as a location in which to depict additional content to the user viewing volume 1008. For example, if the users 1008 and user 1020 are accessing systems 202A and 202B, respectively, both users may wish to share application data, screen data, etc. The image management system 140 may trigger shapes that are generated to mitigate depth conflicts to begin depicting application content, such as content 1204 and 1206. While two application windows are depicted, any number of windows, content, apps, shortcuts, icons, etc. may be depicted. In some implementations, the applications and/or content depicted within a UI element such as element 1202 may include additional UI elements determined to be open during a session of viewing the image content. For example, UI element 1202 may depict a user interface layer having thumbnail images (e.g., content 1204 and content 1206) of additional software programs being executed in memory by the at least one processing device while accessing the image content. Such content 1204 and content 1206 may represent software applications open and executing in memory while a user is operating a telepresence session with user 1002.

In some implementations, to prevent the mitigations described herein from itself generating a depth conflict where the mitigation intersects with a display edge, there are minimal parallax cues available to place the mitigation at a specific z height. For example, applied translucent surfaces read as overlaid on the rendered person, but are perceptually pliable as to the exact height they are perceived. In particular, the vertical frosted design ends up looking similar to the curved frosted design. The perceptual pinning to the display edges in the vertical frosted design may make the flat vertical surface appear to be similarly curved.

In some implementations, the gradient blur variants described herein provide the advantage of avoiding a sharp upper edge. The blur may provide an improved amount of depth conflict reduction. In some implementations, the gradient blur may be applied at specific areas in which depth conflicts are detected, but not applied outside of those areas. That is, rather than an entire bottom edge of gradient blur, the gradient blur may be placed at portions of the display edge where content (e.g., user portions, objects, etc.) are creating depth conflicts. For example, the systems described herein may detect depth conflicts using detected head pose in combination with rendered content. Then, gradient blur effects may be added at the depth conflict portions. The blur type may vary based on the detected level of depth conflict. The gradient may be adjustable to taper off away from an edge of the display.

Figure 13:
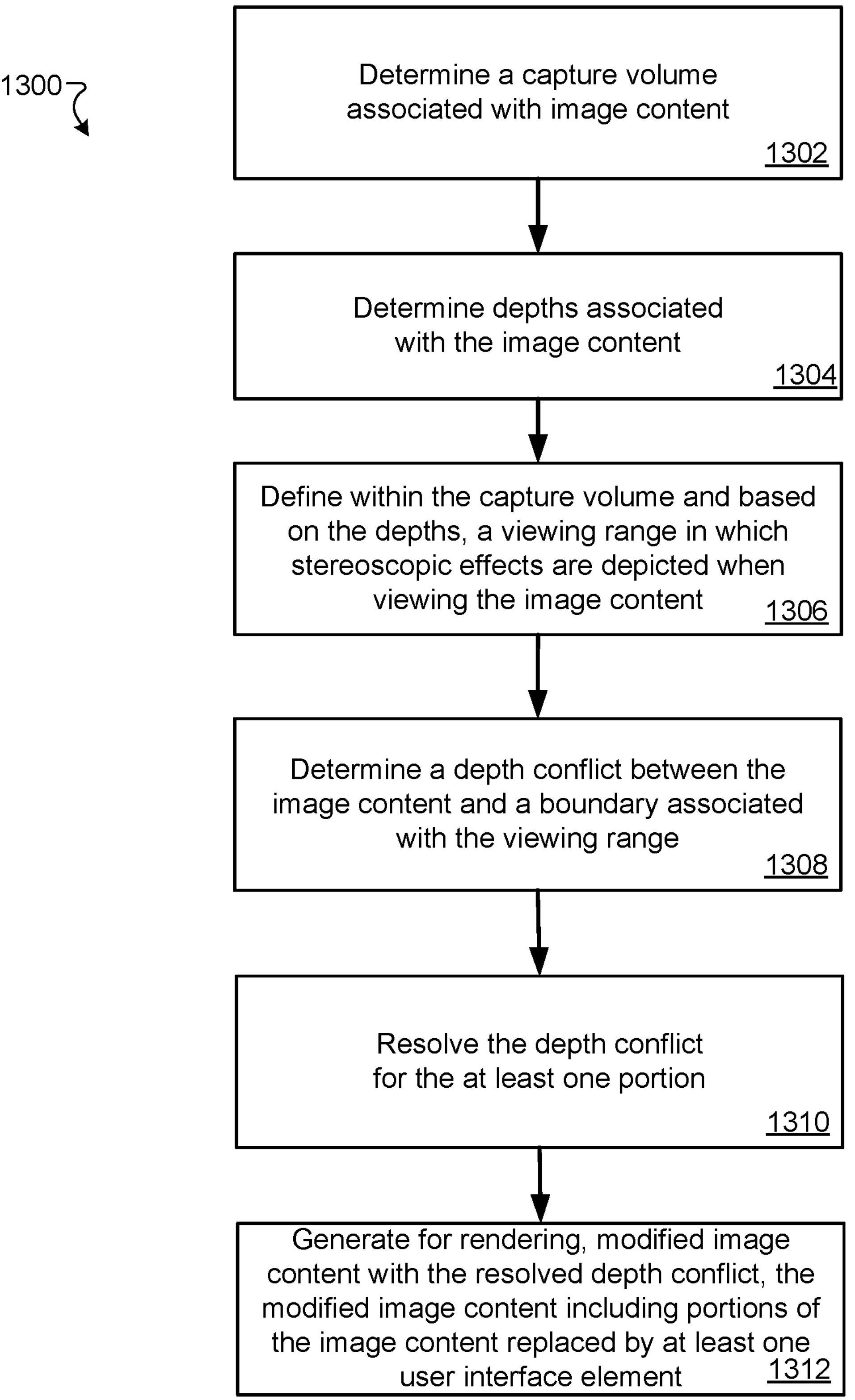
FIG. 13 is a flow chart diagramming one example of a process to resolve depth conflict in a 3D content system, according to implementations described throughout this disclosure.

FIG. 13 is a flow chart diagramming one example of a process 1300 to resolve depth conflict in a 3D content system, according to implementations described throughout this disclosure. In some implementations, the process 1300 may utilize an image processing system with at least one processing device and memory storing instructions that when executed cause the processing device to perform the plurality of operations and computer implemented steps described in the claims. In general, the systems 100, 200, and/or 1400 may be used in the description and execution of process 1400. Each of systems 100, 200, and/or 1400 may, in some implementations, represent a single system. In some implementations, the telepresence systems described in systems 202 may perform the operations of the claims. In some implementations, a server 214 accessed by systems 202 may instead perform the operations of the claims.

In general, process 1300 utilizes the systems and algorithms described herein to detect and correct depth conflict for a 3D display. In some implementations, the depth conflict detection is based on head and/or eye tracking and captured depth image pixels. In some implementations, the depth conflict detection is based on other user movements (e.g., hand movements or placement within a capture volume and/or body movements or placement within a capture volume). In some implementations, UI elements are generated to mitigate the detected depth conflicts. In general, the described process 1300 may be performed in image content, video content, virtual content, UI elements, application content, or other camera-captured content.

At block 1302, the process 1300 includes utilizing at least one processing device to perform operations including determining a capture volume associated with captured image content. For example, the capture volume detector 228 may determine a size of the capture volume 502 (FIG. 6), for example. The capture volume may be used to determine whether image content resides within or beyond particular boundaries defined by the capture volume. Such image content that extends beyond the boundaries may cause depth conflicts for a user viewing image content within capture volume 502. In addition, when assessing depth conflicts, UI element data 226 may be taken into account as well as range determinations from range detector 144.

At block 1304, the process 1300 includes determining depths associated with the captured image content. For example, the range detector 144 may calculate depths 232 based on images captured by camera 204 and/or data captured by depth sensor 206. The depths may pertain to objects, users, portions of users, UI elements, or other content captured within systems 202.

At block 1306, the process 1300 includes defining, within the capture volume and based on the depths, a viewing range in which stereoscopic effects are depicted when viewing the captured image content. For example, the range detector 144 may utilize the depths 232 and the capture volume 502 size to determine a viewing range, which may be a viewing range (e.g., size, window, volume) for viewing 3D stereoscopic effects and 3D content within a 3D display rendering the image content (such as a lenticular display). Determining such a viewing range can enable system 200 to properly ascertain where particular depth conflicts may occur.

At block 1308, the process 1300 includes determining a depth conflict between the captured image content and a boundary associated with the viewing range. For example, the depth conflict resolver 142 may detect that the hand 508 (FIG. 6) is outside of the boundary of the capture volume 502 at a bottom edge of the volume 502 (i.e., the bottom edge of a display device, as shown by boundary 1012 in FIG. 10A). Here, the depth conflict resolver 142 may use the capture volume detector 228 to detect that at least one portion of the captured image content (i.e., the portion of hand 508 in FIG. 6) extends beyond the boundary 1012 associated with the viewing range defined by capture volume 502 and/or volume 504, in some implementations.

In some implementations, detecting a depth conflict between the at least one portion of the image content (e.g., the portion of hand 508) and the boundary associated with the viewing range (e.g., boundary 1012) may include using at least some of the determined depths 232 associated with the image content (e.g., head 506 and hand 508) to generate 3D voxels representing a position in a plane of a display (e.g., the z-plane of the display) rendering the captured image content. In this example, the depths used to detect and/or correct depth conflicts may include the depths of the hand 508. The distance may include a distance from the boundary 1012 to the portion of the hand that is outside of the boundary 1012. A UI element to correct the depth perception may be selected based on the distance. In some implementations, the boundary 1012 is associated with at least one edge of a lenticular display device.

In some implementations, voxels (e.g., voxels 246) may be generated using the UI element data 226. The voxels 246 may be derived from point clouds defined in 3D space. Voxels 246 may include pixel grids that define a number of cells with a fixed size and discrete coordinates. The voxels 246 may be used to determine which portions of particular image content may cause a depth conflict and which of those portions should be corrected, resolved, obfuscated, or otherwise modified to avoid the depth conflict.

In some implementations, a depth conflict may be determined based on a tracked head position of a user viewing the image content at a remote lenticular display device. For example, a depth conflict pertaining to the hand 508 may be determined based on a remote user (head 408 in FIG. 6) viewing angle (e.g., sightline 602). The tracked head position may be determined or provided via tracking module 216 using head/eye tracker 218, hand tracker 220, and/or movement detector 222, for example.

At block 1310, the process 1300 includes responsive to determining the depth conflict, resolving the depth conflict for the at least one portion using the viewing range and at least one UI element. For example, the depth conflict resolver may use the determined viewing range with respect to the hand 508 in order to select a particular UI element to be generated and/or modified. Such UI elements may be generated by UI generator 146 and provided for rendering with the image content. In some implementations, resolving the depth conflict includes generating a UI element representing a frame surrounding the image content within volume 502. The frame (e.g., frame 1006 in FIG. 10B) may be adaptive to accommodate movements depicted in the captured image content. For example, the frame 1006 may be modified in size, shape or other factor to resolve (e.g., cover) the depth conflict. In some implementations, other generated UI elements may be adjusted in size and/or shape in order to resolve a depth conflict. In some implementations, adjusting a size of a particular UI element is based on the tracked head position of the user viewing particular image content.

In some implementations, a side of a UI element such as frame 1006 corresponding to the at least one portion (hand 508) which extended beyond the boundary of the capture volume 502 may be placed in a different plane parallel to, and in front of, the remainder of the frame to generate a visually perceived tilt of the frame from vertical to a non-zero angle to the vertical, as shown by FIGS. 7A-7B.

At block 1312, the process 1300 includes generating, for rendering, modified image content with the resolved depth conflict. The modified image content may include portions of the image content replaced by the at least one UI element. For example, the UI element may include a blurred overlay. The blurred overlay may be generated by UI generator 146. The blurred overlay may be 2D or 3D. The blurred overlay may begin at a boundary of the capture volume 502, for example, and may end at a predefined location associated with a size of a display device depicting the image content. For example, the size of the display may include predefined minimum and maximum sizes for frame, overlay, or UI elements.

In some implementations, the UI elements, such as a blurred overlay, may be defined by depth conflict resolver 142 and UI generator 146 with a blur radius associated that may be increased at a threshold distance from the boundary. For example, the blur radius may be animated according to movements of the image content. In such examples, animating the blur radius (or other UI element) may resolve and/or hide a depth conflict.

In some implementations, the blurred overlays may be shaped according to determined depth conflicts. In some implementations, the blurred overlays may be shaped according to a size or shape of the depicted image content. Example shapes may include, but are not limited to square, rectangle, oval, semi-circle, semi-oval, trapezoidal, etc.

In some implementations, the blurred overlays described herein may include additional UI elements determined to be open during a session of viewing the image content. For example, the additional UI elements may include software programs being accessed (i.e., executing in memory) by the at least one processing device while accessing the image content on a display device. The software programs/applications may be displayed as selectable UI elements overlaid on the blurred overlays. A user may select a particular application to depict the application in a larger form and to begin using the application within, around, or otherwise near the depicted image and/or video content.

In some implementations, the blurred overlay is a gradient blur graduating from a left central portion of the overlay to a left edge of the image content and from a right central portion of the overlay to a right edge of the image content, as shown in FIG. 11. Other variations of gradient blurring are possible and FIG. 11 shows just one example of graduated blurring.

In some implementations, lower boundaries of capture volumes may be used as an interaction zone in which hand gestures and such often occur. For example, the image management system 140 may distinguish between a lower part of a display screen (where depth conflict is more problematic) and a mid-to-upper part of the display screen, where interactive elements can reside.

Figure 14:
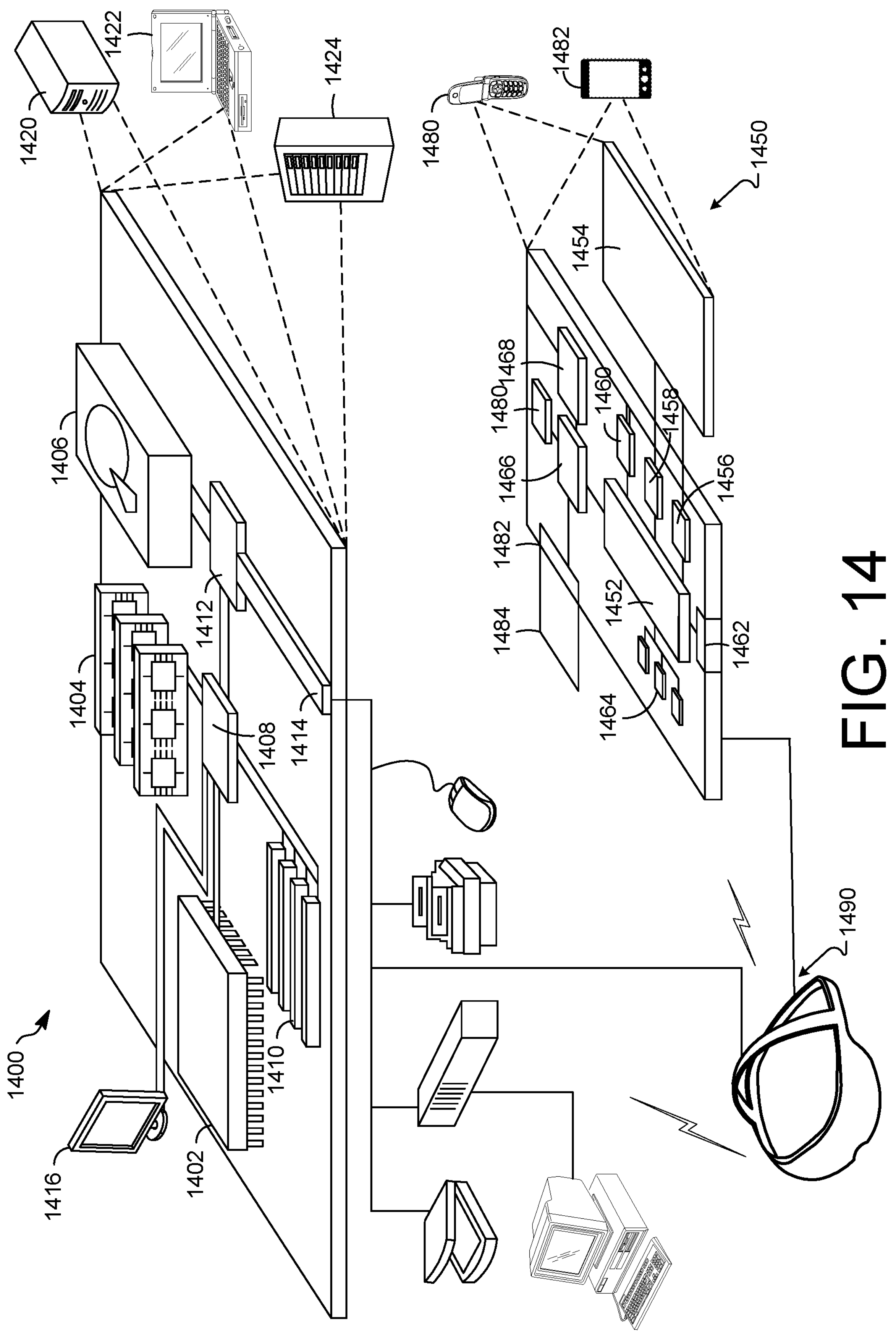
FIG. 14 illustrates an example of a computer device and a mobile computer device, which may be used with the techniques described herein.

FIG. 14 shows an example of a computer device 1400 and a mobile computer device 1450, which may be used with the described techniques. Computing device 1400 can include a processor 1402, memory 1404, a storage device 1406, a high-speed interface 1408 connecting to memory 1404 and high-speed expansion ports 1410, and a low speed interface 1412 connecting to low speed bus 1414 and storage device 1406. Components 1402, 1404, 1406, 1408, 1410, and 1412, are interconnected using various busses, and can be mounted on a common motherboard or in other manners as appropriate. Processor 1402 can process instructions for execution within the computing device 1400, including instructions stored in the memory 1404 or on storage device 1406 to display graphical information for a GUI on an external input/output device, such as display 1416 coupled to high speed interface 1408. In some embodiments, multiple processors and/or multiple buses can be used, as appropriate, along with multiple memories and types of memory. In addition, multiple computing devices 1400 can be connected, with each device providing portions of the necessary operations (e.g., as a server bank, a group of blade servers, or a multi-processor system).

Memory 1404 stores information within computing device 1400. In one embodiment, memory 1404 is a volatile memory unit or units. In another embodiment, memory 1404 is a non-volatile memory unit or units. Memory 1404 may also be another form of computer-readable medium, such as a magnetic or optical disk.

Storage device 1406 can provide mass storage for the computing device 1400. In one embodiment, storage device 1406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer- or machine-readable medium, such as memory 1404, storage device 1406, or memory on processor 1402.

High speed controller 1408 manages bandwidth-intensive operations for computing device 1400, while low speed controller 1412 manages lower bandwidth-intensive operations. Such allocation of functions is exemplary only. In one embodiment, high-speed controller 1408 is coupled to memory 1404, display 1416 (e.g., through a graphics processor or accelerator), and to high-speed expansion ports 1410, which may accept various expansion cards (not shown). Low-speed controller 1412 can be coupled to storage device 1406 and low-speed expansion port 1414. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

Computing device 1400 can be implemented in a number of different forms, as shown in the figure. For example, it can be implemented as a standard server 1420, or multiple times in a group of such servers. It can also be implemented as part of a rack server system 1424. In addition, it can be implemented in a personal computer such as a laptop computer 1422. Alternatively, components from computing device 1400 can be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes processor 1452, memory 1464, an input/output device such as display 1454, communication interface 1466, and transceiver 1468, among other components. Device 1450 may also be provided with a storage device, such as a microdrive or other device, to provide additional storage. Each of components 1450, 1452, 1464, 1454, 1466, and 1468, are interconnected using various buses, and several of the components may be mounted on a common motherboard or in other manners as appropriate. Processor 1452 can execute instructions within the computing device 1450, including instructions stored in memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to display 1454. Display 1454 may be, for example, a TFT LCD (Thin-Film-Transistor Liquid Crystal Display) or an OLED (Organic Light Emitting Diode) display, or other appropriate display technology. Display interface 1456 may comprise appropriate circuitry for driving display 1454 to present graphical and other information to a user. Control interface 1458 may receive commands from a user and convert them for submission to processor 1452. In addition, external interface 1462 may communicate with processor 1452, so as to enable near area communication of device 1450 with other devices. External interface 1462 can provide, for example, for wired or wireless communication in some embodiments multiple interfaces can be used.

Memory 1464 stores information within computing device 1450. Memory 1464 can be implemented as one or more of a computer-readable medium or media, a volatile memory unit or units, or a non-volatile memory unit or units. Expansion memory 1484 may also be provided and connected to device 1450 through expansion interface 1482, which may include, for example, a SIMM (Single In Line Memory Module) card interface. Such expansion memory 1484 may provide extra storage space for device 1450, or may also store applications or other information for device 1450. Specifically, expansion memory 1484 may include instructions to carry out or supplement the processes described above, and may include secure information also. Thus, for example, expansion memory 1484 can be a security module for device 1450, and can be programmed with instructions that permit secure use of device 1450. In addition, secure applications may be provided via the SIMM cards, along with additional information, such as placing identifying information on the SIMM card in a non-hackable manner.

The memory can include, for example, flash memory and/or NVRAM memory, as discussed below. In one embodiment, a computer program product is tangibly embodied in an information carrier. The computer program product contains instructions that, when executed, perform one or more methods, such as those described above. The information carrier is a computer- or machine-readable medium, such as the memory 1464, expansion memory 1484, or memory on processor 1452 that may be received, for example, over transceiver 1468 or external interface 1462.

Device 1450 can communicate wirelessly through communication interface 1466, which can include digital signal processing circuitry where necessary. Communication interface 1466 can provide communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 1468. In addition, short-range communication can occur, such as using a Bluetooth, Wi-Fi, or other such transceiver (not shown). In addition, GPS (Global Positioning System) receiver module 1480 can provide additional navigation- and location-related wireless data to device 1450, which can be used as appropriate by applications running on device 1450.

Device 1450 can also communicate audibly using audio codec 1460, which may receive spoken information from a user and convert it to usable digital information. Audio codec 1460 may likewise generate audible sounds for a user, such as through a speaker, e.g., in a handset of device 1450. Such sound can include sound from voice telephone calls, can include recorded sound (e.g., voice messages, music files, etc.) and can also include sound generated by applications operating on device 1450.

Computing device 1450 can be implemented in a number of different forms, as shown in the figure. For example, it can be implemented as cellular telephone 1480. It can also be implemented as part of smart phone 1482, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms “machine-readable medium” “computer-readable medium” refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term “machine-readable signal” refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network (“LAN”), a wide area network (“WAN”), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 14 can include sensors that interface with a virtual reality or AR headset (VR headset/AR headset/HMD device 1490). For example, one or more sensors included on computing device 1450 or other computing device depicted in FIG. 14, can provide input to VR headset 1490 or in general, provide input to a VR space. The sensors can include, but are not limited to, a touchscreen, accelerometers, gyroscopes, pressure sensors, biometric sensors, temperature sensors, humidity sensors, and ambient light sensors. Computing device 1450 can use the sensors to determine an absolute position and/or a detected rotation of the computing device in the VR space that can then be used as input to the VR space. For example, computing device 1450 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space.

In some embodiments, one or more input devices included on, or connect to, the computing device 1450 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1450 when the computing device is incorporated into the VR space can cause a particular action to occur in the VR space.

In some embodiments, one or more output devices included on the computing device 1450 can provide output and/or feedback to a user of the VR headset 1490 in the VR space. The output and feedback can be visual, tactical, or audio. The output and/or feedback can include, but is not limited to, rendering the VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 1450 can be placed within VR headset 1490 to create a VR system. VR headset 1490 can include one or more positioning elements that allow for the placement of computing device 1450, such as smart phone 1482, in the appropriate position within VR headset 1490. In such embodiments, the display of smart phone 1482 can render stereoscopic images representing the VR space or virtual environment.

In some embodiments, the computing device 1450 may appear as another object in a computer-generated, 3D environment. Interactions by the user with the computing device 1450 (e.g., rotating, shaking, touching a touchscreen, swiping a finger across a touch screen) can be interpreted as interactions with the object in the VR space. As just one example, computing device can be a laser pointer. In such an example, computing device 1450 appears as a virtual laser pointer in the computer-generated, 3D environment. As the user manipulates computing device 1450, the user in the VR space sees movement of the laser pointer. The user receives feedback from interactions with the computing device 1450 in the VR environment on the computing device 1450 or on the VR headset 1490.

In some embodiments, a computing device 1450 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit the disclosed embodiments.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:

determining a capture volume and depths associated with image content captured by at least one camera;

defining, within the capture volume and based on the depths, a viewing range in which stereoscopic effects are depicted when viewing the image content;

determining a depth conflict between the image content and a boundary associated with the viewing range, the determining including detecting that at least one portion of the image content extends beyond the boundary associated with the viewing range, the depth conflict being determined based on a tracked head position of a user viewing the image content;

resolving the depth conflict for the at least one portion using the viewing range and at least one user interface element; and generating, for rendering, modified image content with the resolved depth conflict, the modified image content including portions of the image content replaced by the at least one user interface element, the resolving includes animating the at least one user interface element to hide the at least one portion of the image content with the modified image content.

2. The method of claim 1, wherein:

detecting the depth conflict between the image content and the boundary associated with the viewing range includes using at least some of the depths associated with the image content to generate a plurality of three-dimensional voxels representing a position in a plane of a display rendering the image content, the at least one portion having a distance to the boundary; and the at least one user interface element is selected based on the distance.

3. The method of claim 1, wherein:

the boundary is associated with at least one edge of a lenticular display device;

the tracked head position is based on the user viewing the image content at a remote lenticular display device; and resolving the depth conflict includes adjusting a size of the at least one user interface element based on the tracked head position of the user.

4. The method of claim 1, wherein resolving the depth conflict includes generating the at least one user interface element as a frame overlaying at least some of the image content, the frame being adaptive to accommodate movements depicted in the image content.

5. The method of claim 4, wherein a side of the frame that corresponds to the at least one portion that extended beyond the boundary is placed in a different plane parallel to, and in front of, a remainder of the frame to generate a visually perceived tilt of the frame from a vertical to a non-zero angle to the vertical.

6. The method of claim 1, wherein the at least one user interface element depicts a user interface layer having thumbnail images of additional software programs being executed in memory by at least one processing device while accessing the image content.

7. The method of claim 1, wherein the at least one user interface element includes a blurred overlay, the blurred overlay beginning at the boundary and ending at a predefined location associated with a size of a display device depicting the image content, wherein a blur radius associated with the blurred overlay is increased at a threshold distance from the boundary.

8. The method of claim 7, wherein the blurred overlay includes a user interface layer having thumbnail images of additional software programs being executed in memory by at least one processing device while accessing the image content.

9. The method of claim 7, wherein the blurred overlay is oval-shaped.

10. The method of claim 7, wherein the blurred overlay is gradient blur graduating from a left central portion of the blurred overlay to a left edge of the image content and from a right central portion of the blurred overlay to a right edge of the image content.

11. A system comprising:

at least one processing device;

a plurality of stereo cameras; and a memory storing instructions that when executed cause the system to perform operations including:

determining a volume and depths associated with image content captured by the plurality of stereo cameras;

defining, within the volume and based on the depths, a viewing range in which stereoscopic effects occur;

determining a depth conflict between the image content and a boundary associated with the viewing range and with at least one edge of a lenticular display device, the determining including detecting that at least one portion of the image content extends beyond the boundary associated with the viewing range, the depth conflict being determined based on a tracked head position of a user viewing the image content at a remote lenticular display device;

resolving the depth conflict for the at least one portion using the viewing range and adjusting a size of at least one user interface element based on the tracked head position of the user; and generating, for rendering, modified image content with the resolved depth conflict, the modified image content including portions of the image content replaced by the at least one user interface element.

12. The system of claim 11, wherein:

detecting the depth conflict between the image content and the boundary associated with the viewing range includes using at least some of the depths associated with the image content to generate a plurality of three-dimensional voxels representing a position in a plane of a display rendering the image content, the at least one portion having a distance to the boundary; and the at least one user interface element is selected based on the distance.

13. The system of claim 11, wherein resolving the depth conflict includes generating the at least one user interface element as a frame surrounding the image content, the frame being adaptive to accommodate movements depicted in the image content.

14. The system of claim 11, wherein the at least one user interface element includes a blurred overlay, the blurred overlay beginning at the boundary and ending at a predefined location associated with a size of a display device depicting the image content, wherein a blur radius associated with the blurred overlay is increased at a threshold distance from the boundary.

15. A non-transitory, machine-readable medium having instructions stored thereon, the instructions, when executed by a processor, cause a computing device to perform operations including:

while capturing video content with a plurality of stereo cameras:

determining a capture volume and depths associated with captured video content;

defining, within the capture volume and based on the depths, a viewing range in which stereoscopic effects occur;

determining a depth conflict between the captured video content and a boundary associated with the viewing range, the determining including detecting that at least one portion of the captured video content has a distance from the boundary and extends beyond the boundary associated with the viewing range, the depth conflict being determined based on a tracked head position of a user viewing the captured video content, the determining the depth conflict includes using at least some of the depths associated with the video content to generate a plurality of three-dimensional voxels representing a position in a plane of a display rendering the video content;

resolving the depth conflict for the at least one portion using the viewing range and at least one user interface element selected based on the distance; and generating, for rendering, modified video content with the resolved depth conflict, the modified video content including portions of the video content replaced by the at least one user interface element.

16. The non-transitory, machine-readable medium of claim 15, wherein:

the boundary is associated with at least one edge of a lenticular display device;

the tracked head position is based on the user viewing the captured video content at a remote lenticular display device; and resolving the depth conflict includes adjusting a size of the at least one user interface element based on the tracked head position of the user.

17. The non-transitory, machine-readable medium of claim 15, wherein the at least one user interface element includes a blurred overlay, the blurred overlay beginning at the boundary and ending at a predefined location associated with a size of a display device depicting the captured video content, wherein a blur radius associated with the blurred overlay is increased at a threshold distance from the boundary.

* * * * *